March 19, 1968  J. H. AUER, JR., ETAL  3,374,340
COMPUTATION OF PARAMETERS FOR TRAFFIC CONTROL SYSTEMS
Filed July 3, 1963  12 Sheets-Sheet 8

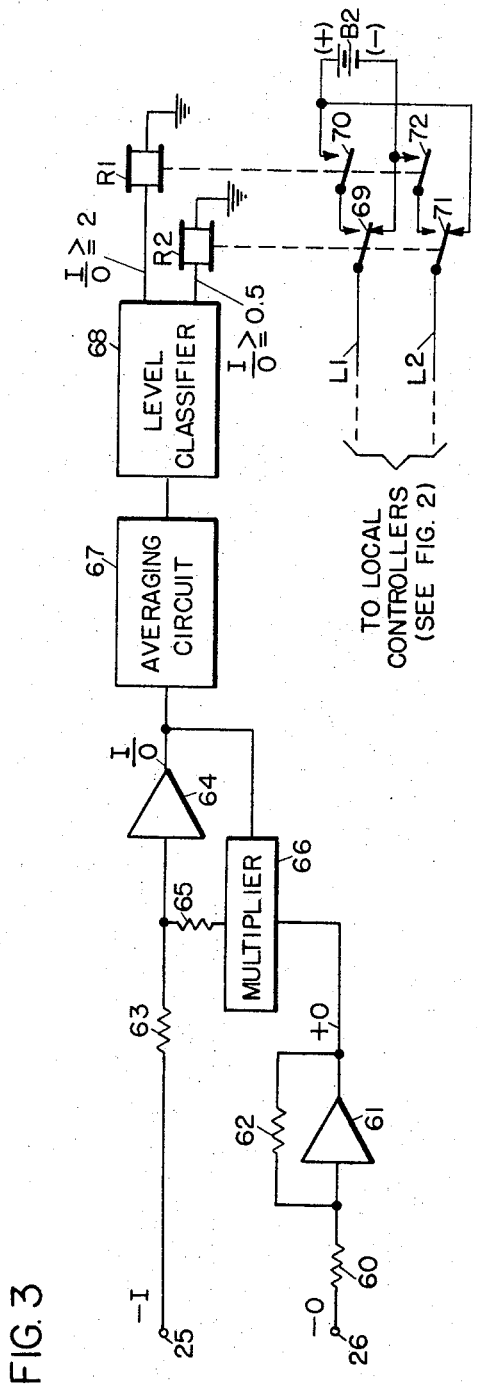
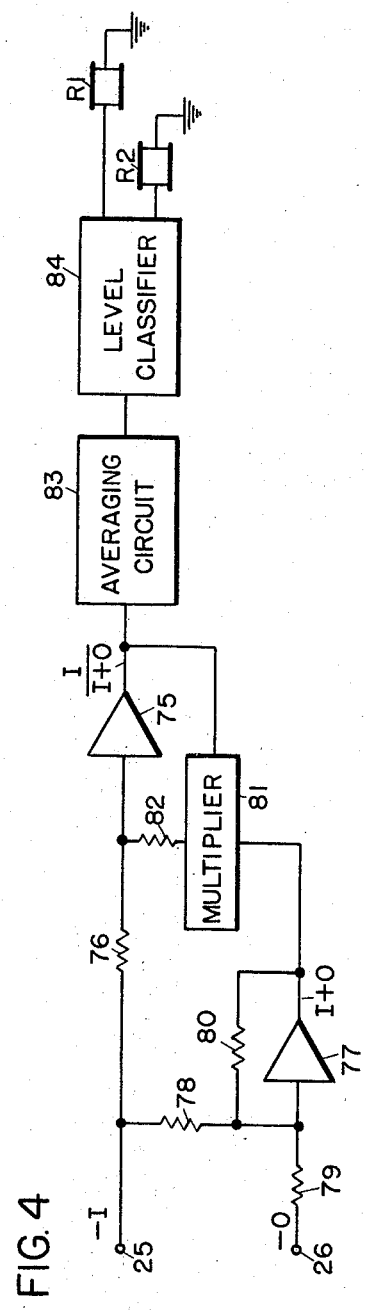

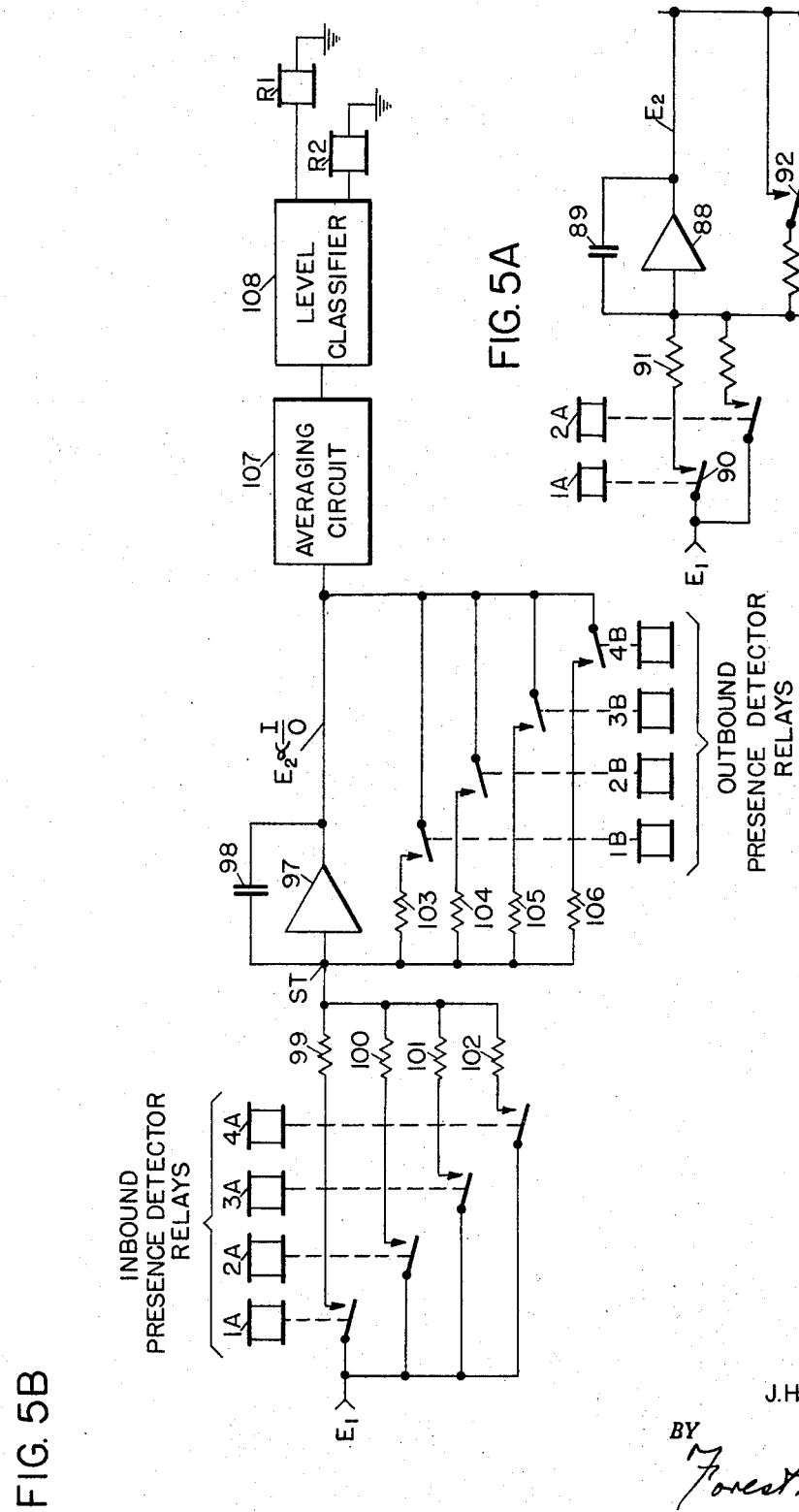

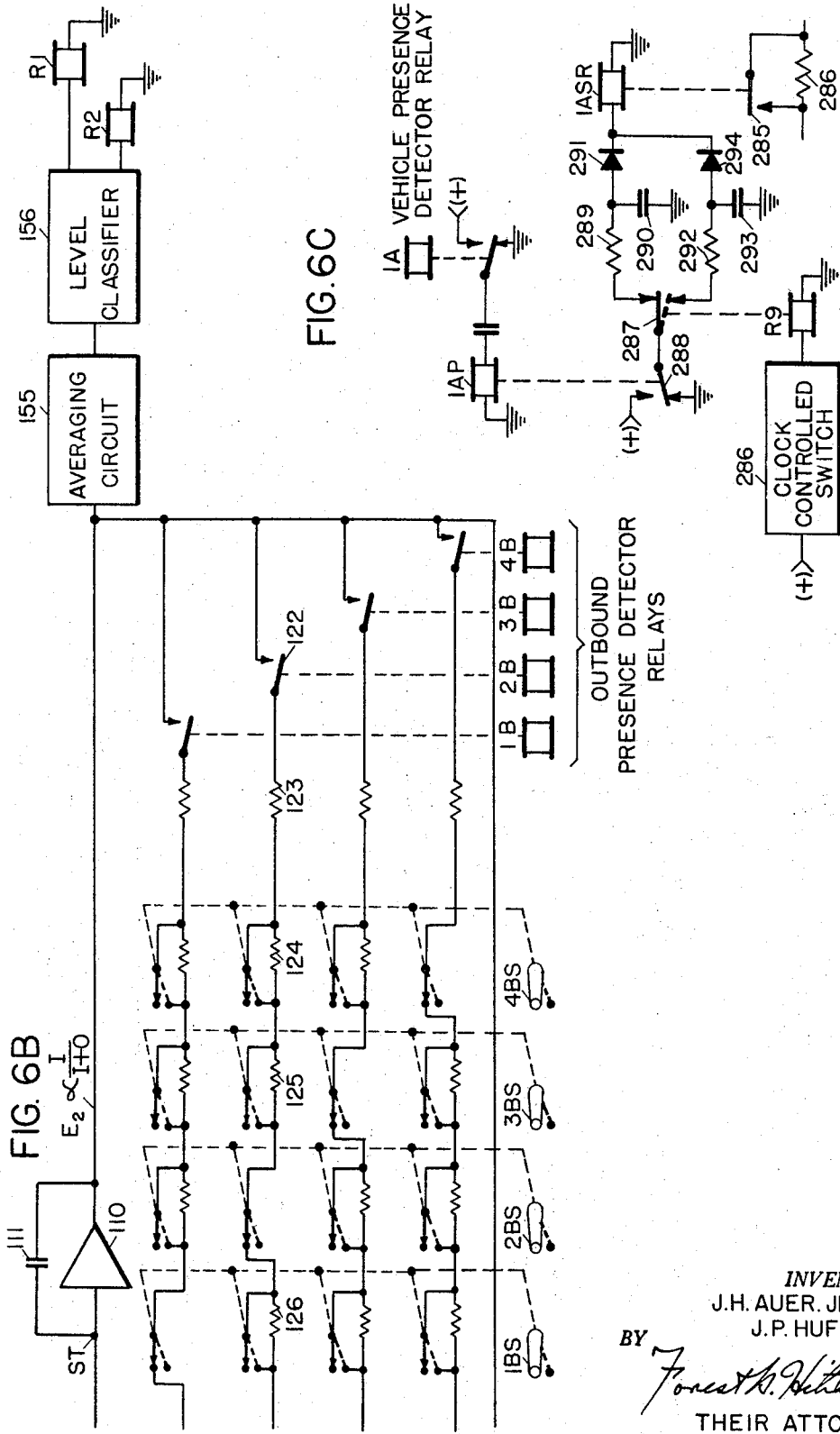

FIG. 8

$$E_2 \propto \frac{C}{C + \frac{1}{2}(I+O)}$$

INVENTORS
J.H. AUER JR. AND
J.P. HUFFMAN
BY
THEIR ATTORNEY

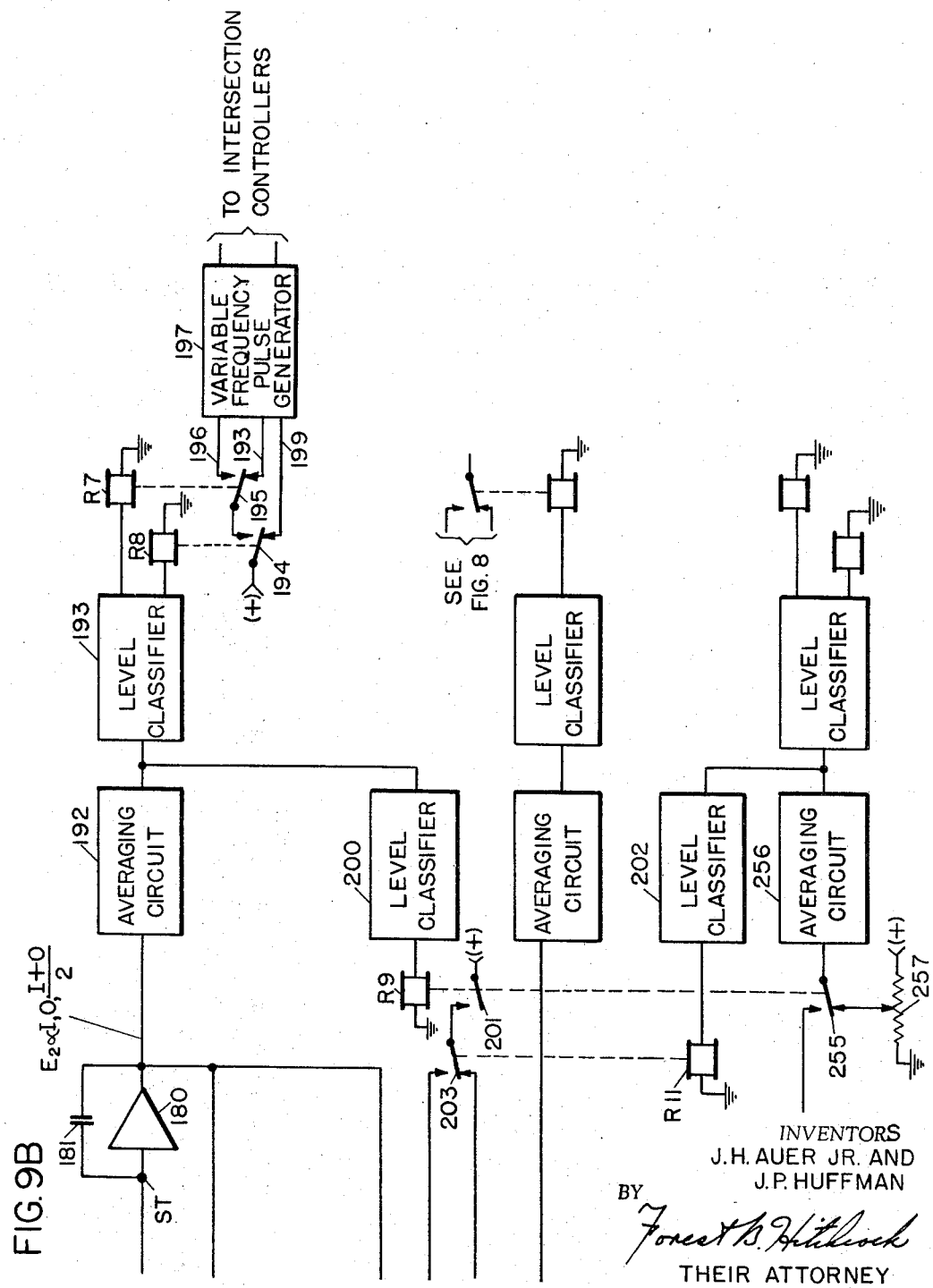

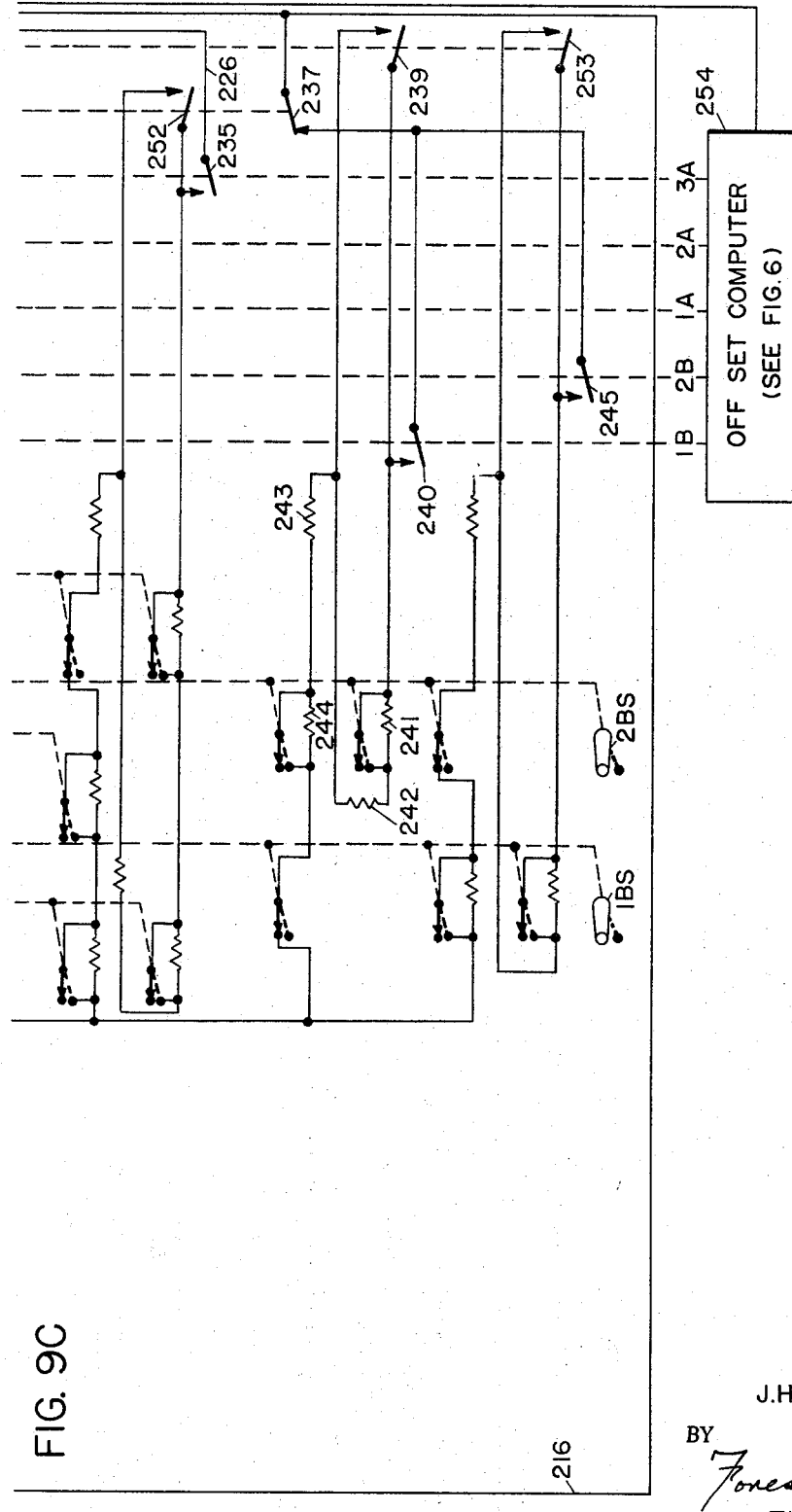

United States Patent Office 3,374,340
Patented Mar. 19, 1968

3,374,340
COMPUTATION OF PARAMETERS FOR
TRAFFIC CONTROL SYSTEMS
John H. Auer, Jr., and Jerry P. Huffman, Rochester, N.Y.,
assignors to The General Signal Corporation, Rochester,
N.Y., a corporation of New York
Filed July 3, 1963, Ser. No. 292,584
33 Claims. (Cl. 235—150.24)

This invention relates to apparatus for the computation of significant traffic control parameters and to systems for the use of these parameters in governing the operation of traffic signals.

It is well known in the prior art to provide vehicle detectors at predetermined locations along a highway and to control traffic signals in accordance with the data received from the vehicle detectors. This is often done in the control of an individual traffic signal, with the relative durations of the main and cross street "proceed" indications being selected in accordance with the relative amounts of traffic congestion on the two streets. More recently, systems have been devised for controlling the signals of an entire system based upon traffic data received from strategically placed vehicle detectors. This results in what may be termed a "closed-loop" system in that the signal indications control the traffic flow, the characteristics of the traffic flow are measured by the vehicle detectors, which in turn then control the signal indications displayed to the traffic.

These techniques have been successfully applied to "progressive" type signalling systems in which the successive traffic signals along an arterial are so time relative to each other that a vehicle passing with a predetermined velocity along the artery in a particular direction will tend to encounter a green signal at each intersection. In controlling the signals for such a complete, progressive system, it has been found advantageous to provide separate control for cycle length, cycle split, and offset in accordance with measured traffic parameters.

The signal control systems of the prior art have generally used either vehicle volume or vehicle density measurements to determine the optimum conditions of cycle length, cycle split and offset. In one such system, the volume of vehicles, i.e., the time rate of vehicle detection, is measured separately for both the inbound and outbound directions of an artery and the larger of the two vehicle volumes thus measured governs the cycle length. Cycle length is increased in response to increased traffic volume because it has generally been found that a longer cycle tends to keep traffic flowing. Also, since there are fewer signal changes in any given interval when cycle length is increased, there are also fewer clearance periods, i.e., amber signal periods, and thus more time is available for the display of green signal indications. It is also known that the parameter of vehicle density, i.e., vehicles per mile, may be measured and similarly used to control cycle length.

It is also well known to compare the inbound and outbound traffic volumes (or densities) on an artery and, dependent upon the relative amounts of traffic thus measured, to select one of a plurality of available offsets. The individual intersection controllers are so constructed that they are capable of operating with any one of a plurality of locally adjustable but remotely selectable phase offsets. A comparison of the inbound and outbound traffic volumes (or densities) makes it possible to select which of the several available offets should be in effect at any time to best accommodate the existing traffic conditions. To illustrate, each controller, in a typical instance, may be controlled to operate with any one of several different phase (i.e., "offset") relationships, A, B, ... etc., of its local signal cycle relative to a system-wide "background" cycle. When inbound traffic, for example, considerably exceeds outbound traffic, offset B may be remotely selected for each intersection controller from a central office where traffic conditions are measured and system decisions are made. Of course, when the system is first adjusted, the several controllers all have their B offsets so adjusted that the relative phase shift from one intersection to the next will tend to facilitate the flow of inbound traffic according to this particular example.

The central office may receive traffic data from one or more cross streets intersecting the artery which indicates the amount of traffic seeking to cross the artery. A comparison of the cross street traffic volume (or denity) with that of the artery makes it possible to determine what the cycle split should be at the corresponding intersection. Often, the cross street traffic at a particular key or "critical" intersection may be considered as being typical of that at many cross street intersections along an artery and thus the relative traffic volumes (or densities) computed for the one intersection may be used to govern the cycle splits for a number of intersections.

Although the use of traffic volume data to control the signals of a system has met wtih some success, there have been serious inadequacies in such systems, and these are due in large part to the inadequacy of traffic volume as a suitable parameter upon which to base judgments. For relatively light traffic conditions, traffic volume fairly accurately represents actual conditions of traffic congestion. However, it has long been recognized that as the traffic congestion increases to high levels, traffic volume will eventually decrease to zero when the highway is blocked, thereby suggesting that congestion is light, whereas it is actually at a maximum.

Recognizing the limitations of traffic volume as a control parameter, traffic engineers have recognized that traffic density is a superior parameter in that it takes account not only of the number of vehicles which pass a given location, but also their speed since density is defined as the number of vehicles per unit distance and may be obtained by dividing vehicle volume by vehicle speed. Although vehicle density is quite clearly an improvement over vehicle volume as a traffic control parameter, it still has a deficiency in that it in no way takes account of vehicle length since it is merely a measure of the number of vehicles which are present on a unit distance of highway lane. Obviously, this cannot provide an entirely accurate portrayal of conditions since, when one considers an extreme case, 100 trucks will obviously provide more traffic congestion over a mile of highway than will 100 compact automobiles; yet, in both cases, equal density values will be obtained. It becomes especially important to take account of this situation and to provide a control parameter which more accurately portrays actual conditions of traffic congestion in the design of traffic control system for highways carrying an appreciable amount of truck traffic.

A traffic control parameter which reflects with a high degree of accuracy the congestion conditions along a highway is "lane occupancy." Lane occupancy is actually the percentage of highway which is vehicle occupied at any given instant of time; however, since this is a spatial concept which is incapable of being measured continuously in a practical manner, lane occupancy is more frequently expressed as a percentage of vehicle presence time to total time at a given measuring point. As will be shown later, the latter measurement provides a close approximation of spatial lane occupancy.

Not only is the parameter of traffic occupancy a quite accurate measure of traffic conditions as just described, but it also has the advantage that it can be readily computed with a minimum of equipment and circuit complexity. Thus, there is no need, for example to provide separately, vehicle volume and speed measurements and then divide the two to derive density. Instead, only the vehicle presence signal of one or more presence-type vehicle detections is required, and from this the occupancy parameter can be computed directly.

Our invention also comprehends a number of alternative ways to obtain various control parameters for the selection of cycle length, cycle split, and offset. The control parameters may, according to certain embodiments of our invention, be computed directly from the vehicle presence signals supplied by presence detectors without any need to pre-compute other parameters; more specifically, as an example, it is possible according to our invention, to obtain an offset control analog which is representative of the relation between inbound and outbond lane occupancies. For this reason, it is possible by the present invention to provide a control system which uses a minimum of equipment, thereby ensuring both economy and reliability of operation.

In order to disclose a specific embodiment of our invention, we have shown how the control parameters may be used to control the signals in a progressive type system, i.e., by controlling cycle length, cycle split and offset, but it will be evident to those skilled in the art that the techniques and means disclosed for the computation of the control parameters of this invention are equally significant in the control of the signals at an isolated intersection and as well in the control of the signals for a complete matrix of streets such as is found in the central portion of a large city.

Described briefly, the invention comprises, first of all, the derivation of lane occupancy measurements; specifically, the separate derivation of inbound and outbound lane occupancy measurements for an artery. These is also disclosed a means for operating upon these computed traffic congestion parameters in several different ways so as to derive additional useful control parameters such as, for example, a parameter which represents the average of the inbound and outbound lane occupancies and which can be used to control cycle length in a progressive type signalling system. In addition, we disclose how inbound and outbound artery occupancies can be subtracted from each other and, alternatively, divided one by another to produce a resultant parameter which may be used for control of signal offset.

We have also disclosed a means for computing a new control parameter which represents the ratio of inbound lane occupancy divided by the sum of inbound and outbound lane occupancies. It will be described in detail below how this constitutes an improved offset control parameter as compared to a parameter which represents merely the difference or, alternatively, the ratio of inbound and outbound lane occupancies. We additionally have disclosed, as another embodiment of our invention, apparatus for computing an offset control parameter whose value varies in proportion to the ratio of the difference between the inbound and outbound lane occupancies and the sum of the inbound and outbound lane occupancies. It is also a part of our invention to provide means for deriving such offset control parameter as well as control parameters for the selection of cycle length and cycle split, all of which are a function of several different traffic congestion factors, without having to derive the several factors themselves.

It is, accordingly, an object of this invention to provide various alternative systems each of which includes traffic responsive apparatus and generates one or more parameters which are useful in the control of a traffic signal or a system of signals.

In describing the invention, reference will be made to the accompanying drawings, in which:

FIG. 1 discloses diagrammatically the placement of vehicle detectors along an artery and also shows a typical circuit for the computation of lane occupancy for each of two directions of traffic;

FIG. 3 is a circuit diagram illustrating the calculation of another offset control parameter which represents the ratio of the inbound and outbound lane occupancy measurements derived in FIG. 1;

FIG. 4 is a circuit diagram illustrating one manner for computing a still different offset control parameter representing a predetermined relationship of inbound and outbound lane occupancies;

FIG. 5A is a circuit diagram illustrating generally how an operational amplifier may be used to derive various desired relationships between independent lane occupancy measurements;

FIG. 5B is a circuit diagram of an embodiment of the invention for computing the ratio of inbound and outbound lane occupancies without the necessity of computing explicitly the individual lane occupancy measurements which make up the desired ratio;

Figure 6A:
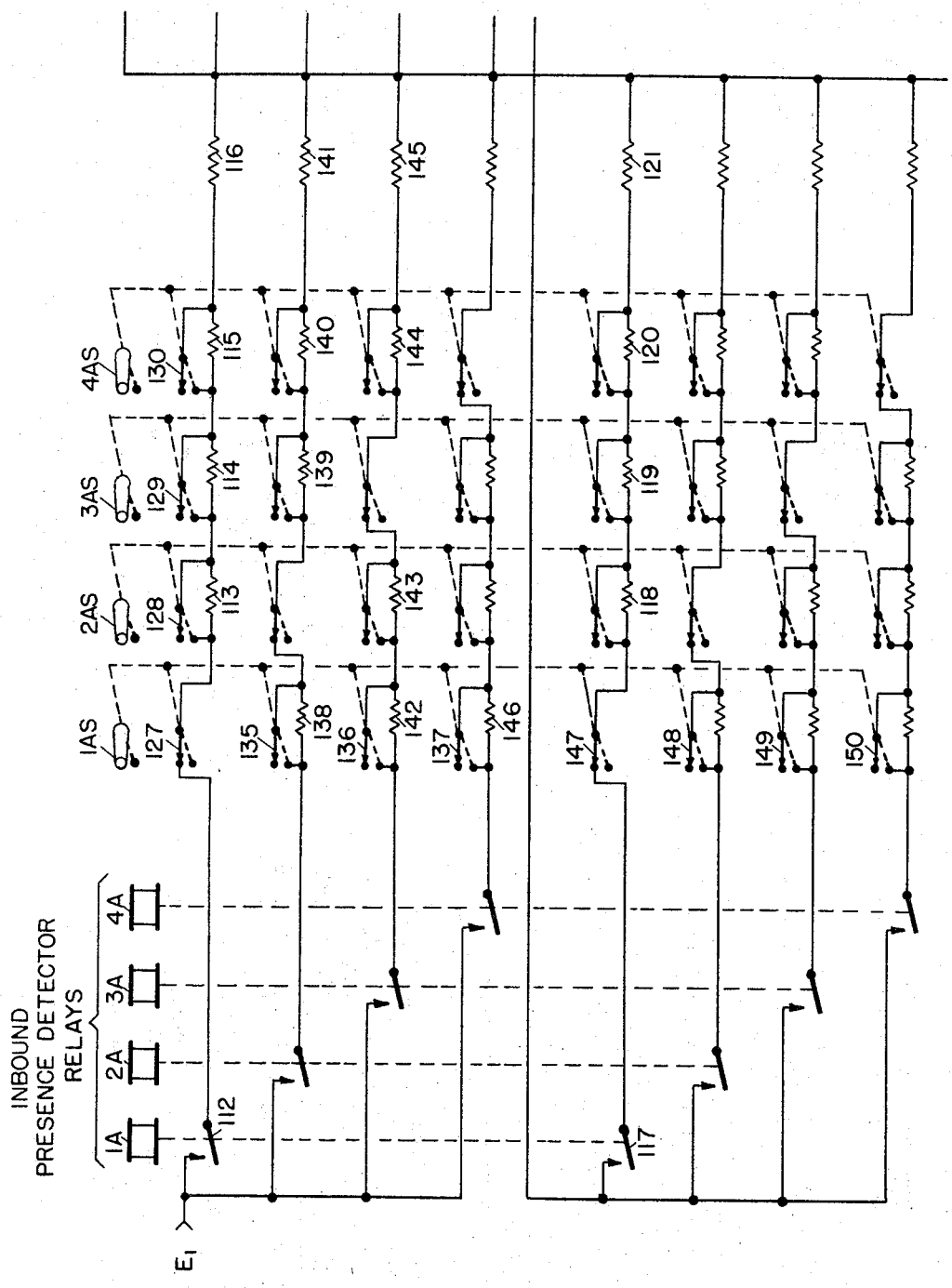
Figure 7:
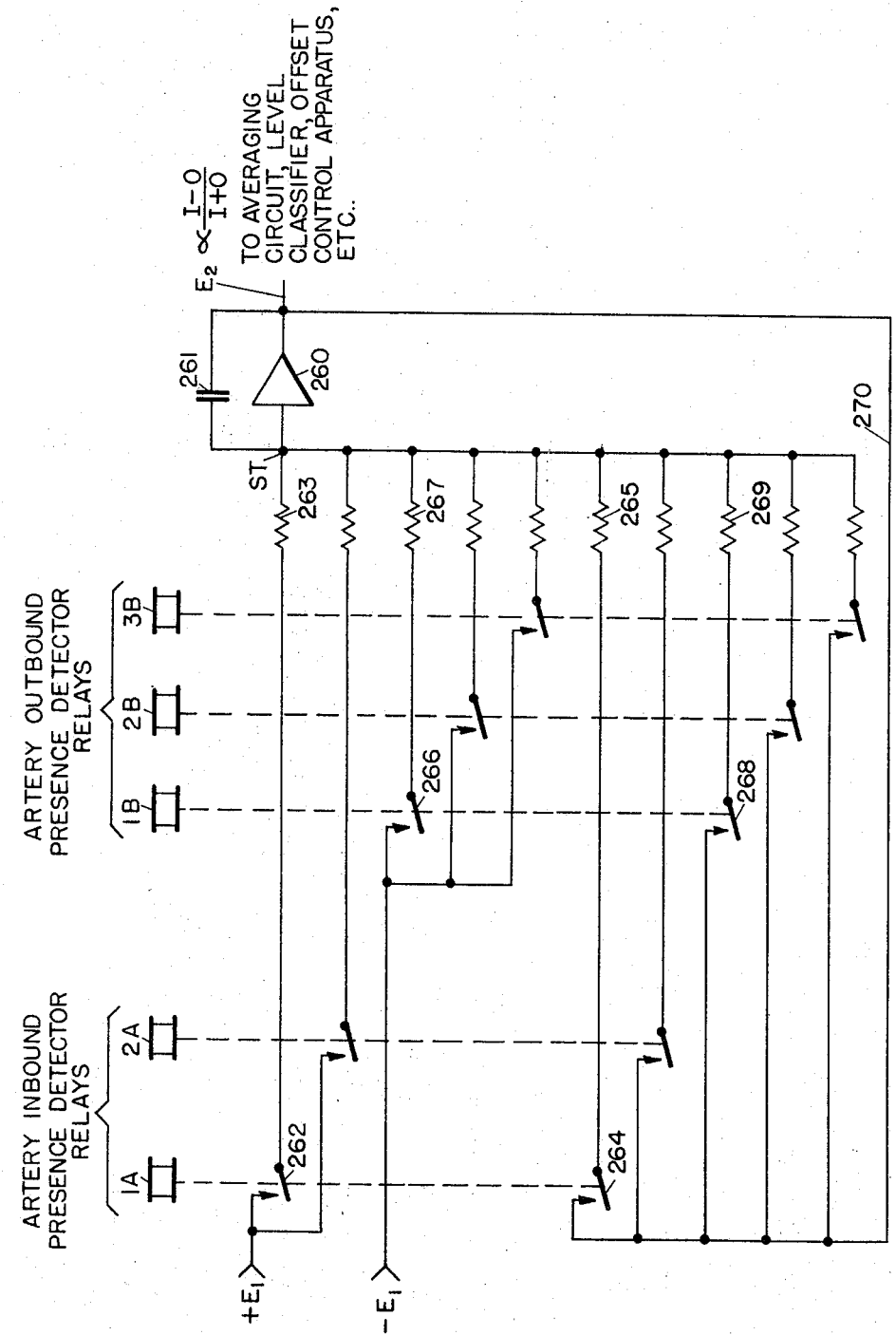

FIGS. 6A and 6B, when arranged with FIG. 6B to the right of FIG. 6A, show a circuit diagram of another embodiment of the invention for computing an offset control parameter which represents a predetermined relationship between inbound and outbound lane occupancies;

FIG. 6C illustrates apparatus which automatically compensates the system for a variable number of vehicle presence detectors;

FIG. 7 is a circuit diagram of another embodiment of our invention for computing an offset control parameter which represents another predetermined relationship between inbound and outbound lane occupancies;

FIG. 8 illustrates a circuit diagram whereby there may be computed a control parameter representing a predetermined relationship between cross street and artery occupancies to control cycle split.

Figure 9A:
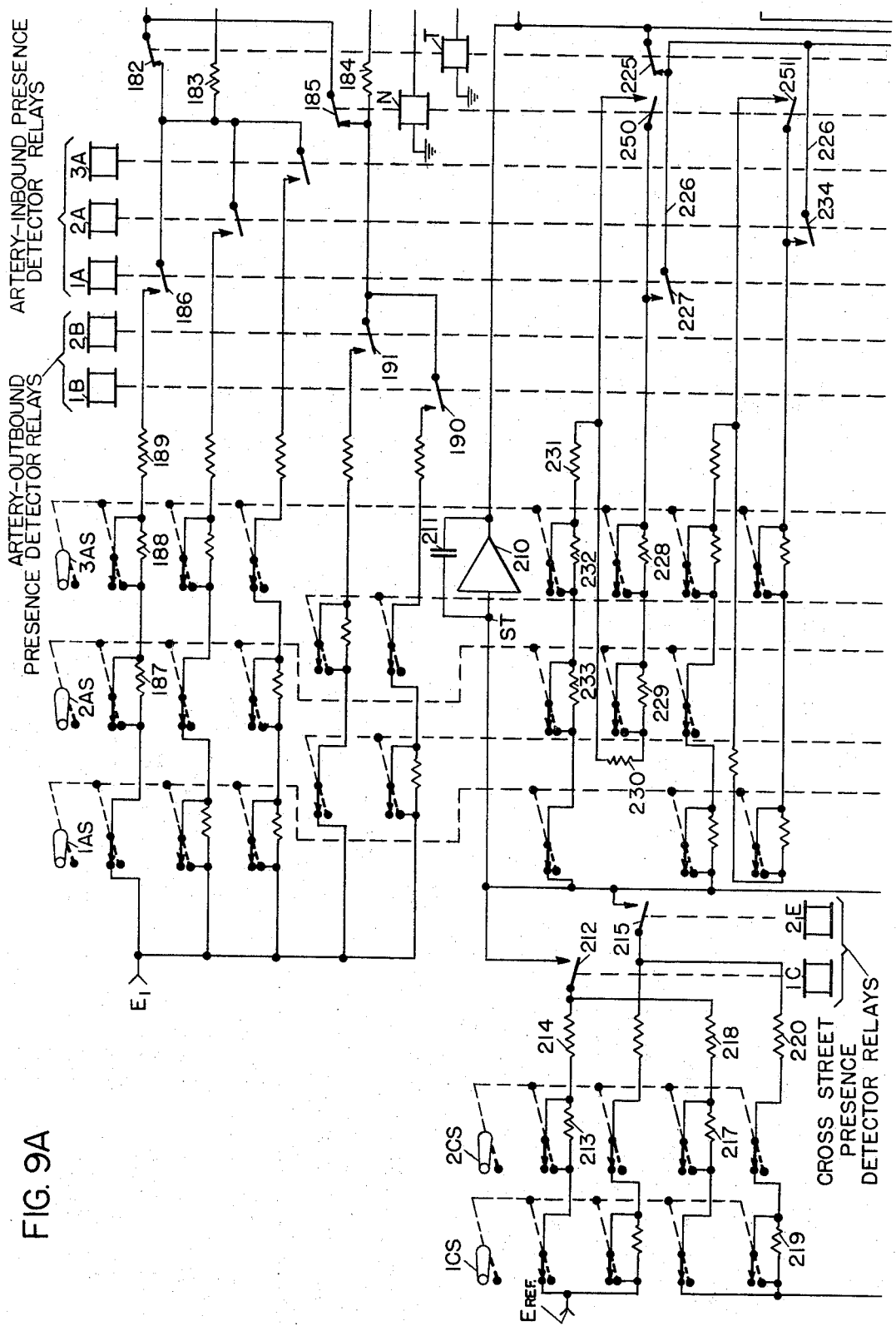
Figure 9D:
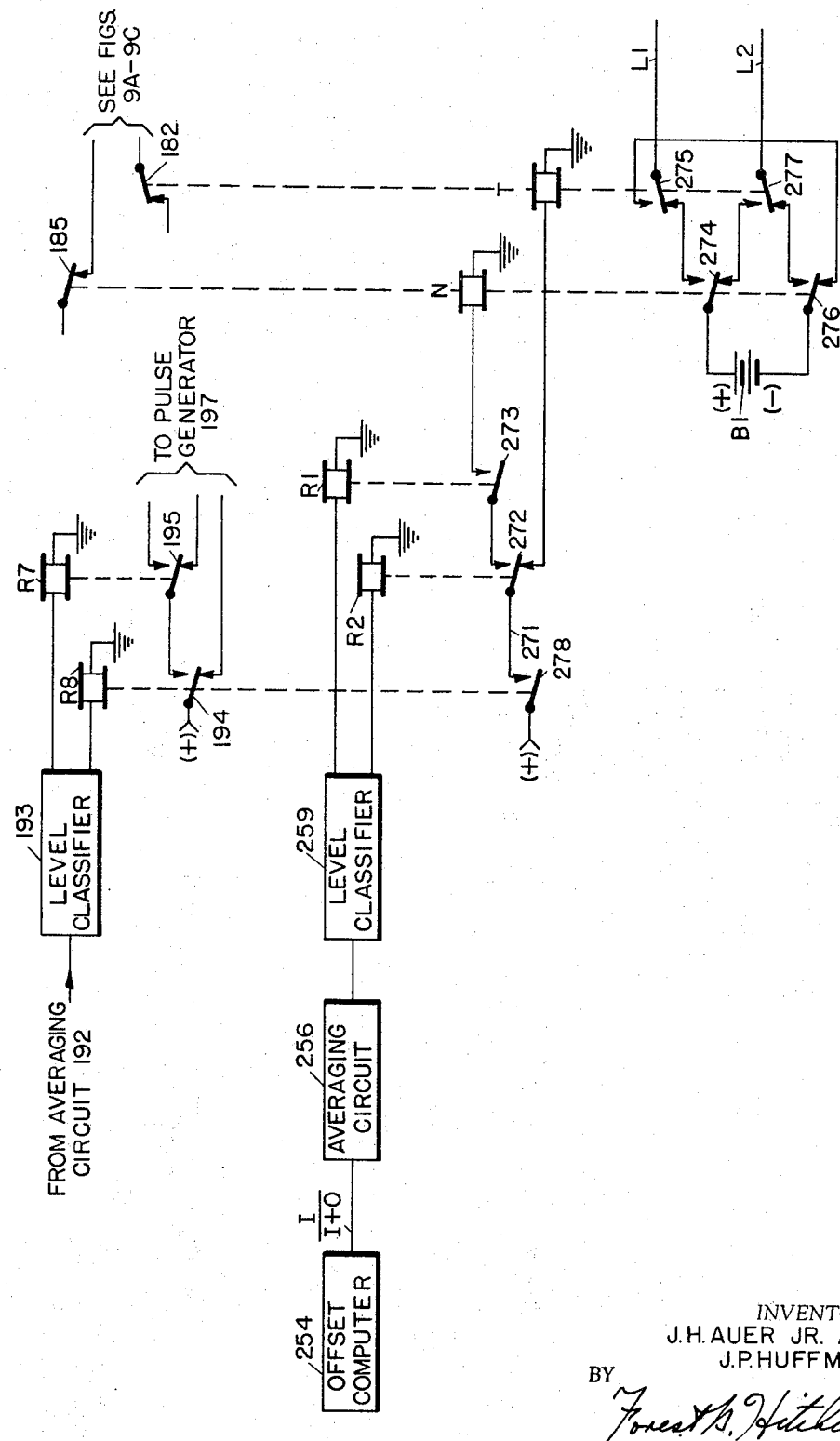

FIGS. 9A, 9B, and 9C when arranged with FIG. 9B to the right of FIG. 9A, comprise a circuit diagram illustrating how lane occupancy measurements may be used to control cycle length, cycle split, an offset in a progressive type signalling system; and FIG. 9D illustrates a circuit modification of the embodiment of our invention shown in FIGS. 9A–9C.

Figure 1:
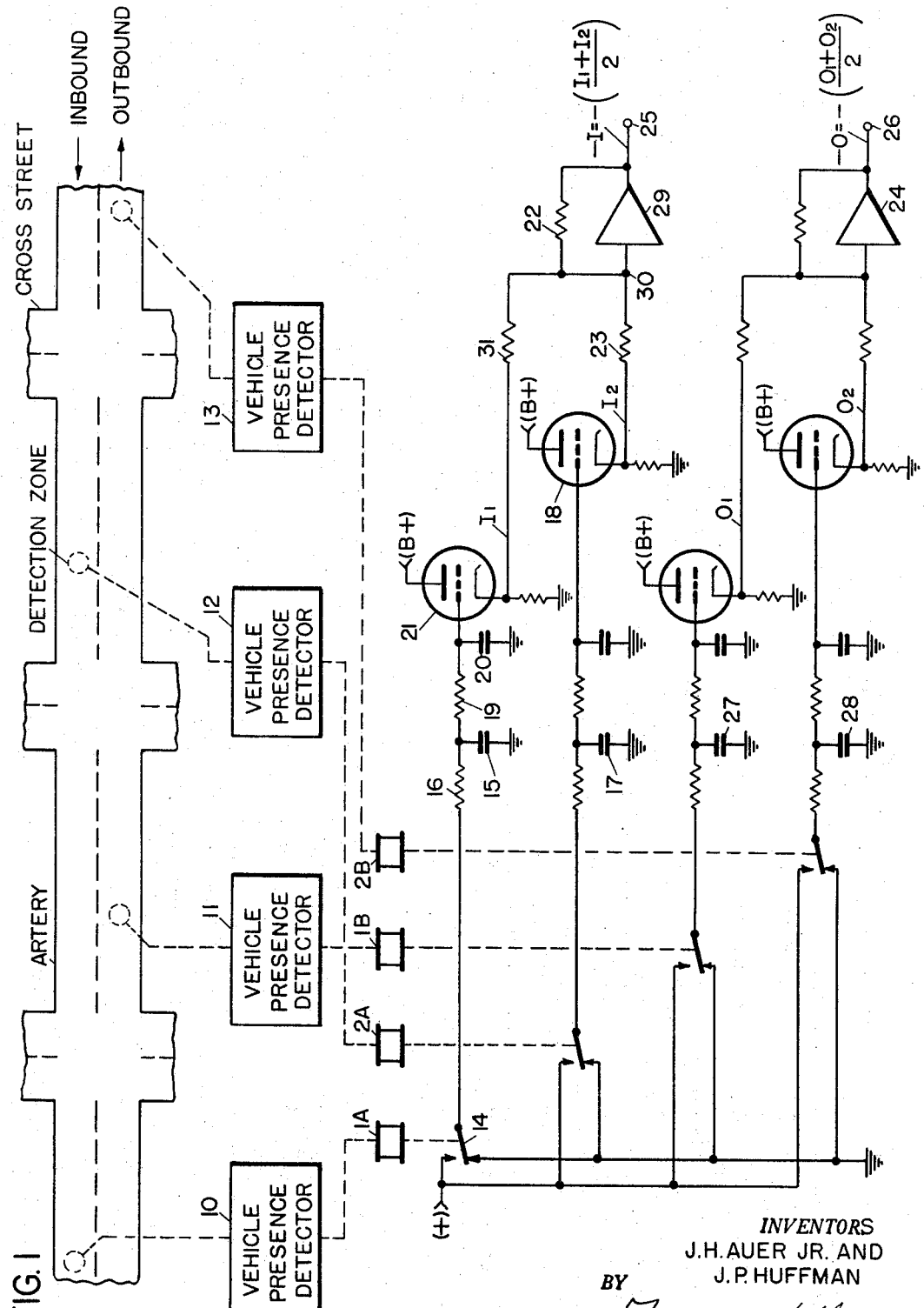

In FIG. 1, the artery, which is intersected by a number of cross streets, is shown as having a plurality of inbound and outbound vehicle presence detectors, each of which defines a respective detection zone and each of which controls as associated relay. Various types of vehicle presence detectors are known in the art. Among these are photoelectric detectors, magnetic loops, and ultrasonic detectors as represented in the patent to Kendall et al. No. 3,042,303 issued July 3, 1962.

Although the ultarsonic type detector of the Kendall et al. patent is preferred, it should be clearly understood that the present invention is by no means limited to the use of a detector of this kind. It is, however, a necessary characteristic of the presence-type detector to be used in the apparatus of this invention that it shall provide an output signal (which may be represented by the picking up of a relay) whose duration shall be quite closely proportional to the length of time that it takes for the detected vehicle to pass through the detection zone. From the foregoing, it will be understood that vehicle presence detector 10 shown in FIG. 1 operates its associated relay such as relay 1A to a picked-up condition whenever a vehicle enters the associated detection zone and that this relay then remains steadily picked up until the vehicle has departed from the detection zone.

Associated with each detector relay is a contact such as contact 14 of relay 1A, and this contact closes a charging circuit to an associated capacitor 15 to charge this capacitor each time that the detector relay is picked up. Specifically, when relay 1A picks up, front contact 14 closes so that energy can be applied from the terminal (+), through resistor 16, to charge capacitor 15. Since the time constant of the charging circuit for capacitor 15 is relatively long compared to the normally expected closure time of contact 14, the increment of charge that capacitor 15 receives in response to each vehicle detected is a function of the length of time that front contact 14 is closed. When relay 1A drops away as the vehicle leaves the detection zone, capacitor 15 discharges through resistor 16 and through back contact 14, to ground. Obviously, the amount of charge that will be lost by capacitor 15 is dependent upon how much time elapses before another vehicle is detected by vehicle detector 10. Over a long period of time, therefore, it will be evident that the amount of charge on capacitor 15 is closely related to the cumulative amount of time that relay 1A is picked up over any given measuring interval i.e. to the percentage of pick-up time of relay 1A over any given interval T.

In the prior application of Hugh C. Kendall and J. H. Auer, Jr., Ser. No. 78,410 filed Dec. 27, 1960, now Patent No. 3,233,089, dated Feb. 1, 1966, it is shown that the amplitude of the voltage reached by capacitor 15 is a quite accurate representation of lane occupancy. Thus, to demonstrate that the percentage of detection time provides a close approximation of traffic occupancy, it will be assumed that throughout the given time interval T, $n$ vehicles pass the detector and that their respective individual velocities are $v_1$, $v_2$, and $v_3$ ... $v_n$. Consequently, the average velocity of the $n$ vehicles $$V_A = \frac{v_1 + v_2 + v_3 \ldots + v_n}{n}$$

Throughout the predetermined observation time T, the length L of the road which is occupied by the $n$ vehicles (together with the empty spaces between successive vehicles) is equal to the average velocity $v_A$ multiplied by the observation time T, i.e., $L = v_A \times T$. In other words, L is the length of the segment of traffic scanned by the detector in time T when that traffic has an average velocity $v_A$. If the length of road required to accommodate the $n$ vehicles when they are bumper-to-bumper is $L_s$, and $L_s = l_1 + l_2 + l_3 \ldots + l_n$ where $l$ = vehicle length. Lane occupancy, defined as fraction of the road covered is then equal to (1) $$\frac{L_s}{L} = \frac{l}{v_A T}(l_1 + l_2 + l_3 \ldots l_n)$$

On the other hand, total detection time of the vehicle detector for the $n$ vehicles $$t \frac{l_1}{v_1} + \frac{l_2}{v_2} + \frac{l_3}{v_3} \ldots + \frac{l_n}{v_n}$$

At the same time, percent detection time $t/T$, which is represented by the voltage across capacitor 15 in FIG. 1, may be expressed as follows:

$$\frac{t}{T} = \frac{l}{T}\frac{l_1}{v_1} + \frac{l_2}{v_2} + \frac{l_3}{v_3} \ldots \frac{l_n}{v_n} = \frac{l}{v_A T} l_1 \cdot \frac{V_A}{V_1} +$$

$$l_2 \cdot \frac{V_A}{V_2} + l_3 \cdot \frac{V_A}{V_3} \ldots l_n \cdot \frac{V_A}{V_N}$$

(2)

A comparison of Equation 2 with Equation 1 shows that they are generally similar and become identical when all of the vehicles travel at the same velocity since then $v_1 = v_2 = v_3 = v_n = v_A$. As the spread of vehicle velocities increases, accuracy tends to decrease. However, for a typical situation where vehicles are of varying lengths and velocities do not vary too widely, it has been found that the percentage of detection time (Equation 2 above), as represented by the voltage across capacitor 15, very closely approximates traffic occupancy as represented in Equation 1. In other words, spatial lane occupancy can be closely approximated by measuring percentage detection time at a given point.

Accuracy in measurement of traffic occupancy becomes increasingly important for higher occupancy values since it is under such circumstances that it is ordinarily desired to take remedial measures. However, it is also at such time that there is the least likelihood that the speeds of individual vehicles will vary widely from the average speed. For this reason, measurement of the percentage of detection time provides increasingly accurate results for higher values of traffic occupancy.

If lane occupancy is to be measured in terms of the percentage detection time experienced by one vehicle presence detector, the measurement must obviously be made over some substantial time interval which is at least long enough that several vehicles may pass through the detection zone while travelling at moderate speeds. This is accomplished in the circuit of FIG. 1 by providing an R-C time constant for resistor 16 and capacitor 15 which is of suitable duration. Additional time averaging is provided through the use of a further R-C combination comprising ressitor 19 and capacitor 20. The voltage across capacitor 20 "follows" that across capacitor 16 but is subject to less short-term variation because of the additional filtering provided.

When the ultimate objective is to determine lane occupancy for a lane of an artery, it is obvious that the use of only a single vehicle presence detector to compute occupancy may give misleading results even where long time averaging is employed. A vehicle may be stalled in the detection zone, for example, resulting eventually in a 100% occupancy measurement for the entire lane even though that lane might then actually be experiencing a much lower value of occupancy. To prevent this, it is desirable to use a plurality of spaced detectors for each lane and to average the results obtained therefrom. This is illustrated in FIG. 1 by the two spaced detectors 10 and 12 for the inbound lane, each of which generates a voltage across its respective capacitor 15 or 17 representing the percentage pick-up time of its corresponding relay 1A, 1B and thus provides a distinct measurement of inbound lane occupancy existing at the corresponding detector location. Consequently, cathode follower tubes 21 and 18 produce individual cathode voltages representing inbound lane occupancies $I_1$ and $I_2$ which may then be averaged in a manner to be described below to obtain a composite inbound lane occupancy voltage I.

In a similar manner, two vehicle presence detectors 12 and 13 are associated with the outbound lane and their respective relays 1B and 2B similarly control the generation of voltages across capacitors 27 and 28, thereby providing lane occupancy analogs for the outbound lane $O_1$ and $O_2$ which may then also be averaged to provide a single output voltage O representative of outbound lane occupancy.

To obtain an average of the two individual occupancy measurements appearing respectively at the cathodes of tubes 18 and 21, an operational amplifier 29 is used. Such amplifiers are well known in the analog computer art and comprise essentially a high gain amplifier which derives its computing characteristic from the particular arrangement of its input and feedback circuits as described, for example, in Van Nostrand's Scientific Encyclopedia, Third Edition, published January 1958, at page 396. If one considers for the amount that amplifier 29 receives only a single input signal such as the lane occupancy voltage $I_1$ applied to its summing point 30 through resistor 31, then it can be shown that the amplifier output voltage equals the negative of the input voltage multiplied by the ratio of the resistance of feedback resistor 22 to series input resistor 31. Similarly, when both individual occupancy voltage analogs $I_1$ and $I_2$ are applied to summing point 30 through resistors 31 and 23, respectively, and assuming that resistors 23 and 31 are of equal value and have one-half the resistance of resistor 22, then the amplifier output voltage will be:

$$-I = -\frac{(I_1 + I_2)}{2}$$

In exactly the same manner, an output voltage O may be obtained from operational amplifier 24 and applied to terminal 26 which is the negative of the average of the two occupancy analog voltages $O_1$ and $O_2$, i.e., $$-O = -\frac{(O_1 + O_2)}{2}$$

Figure 2:
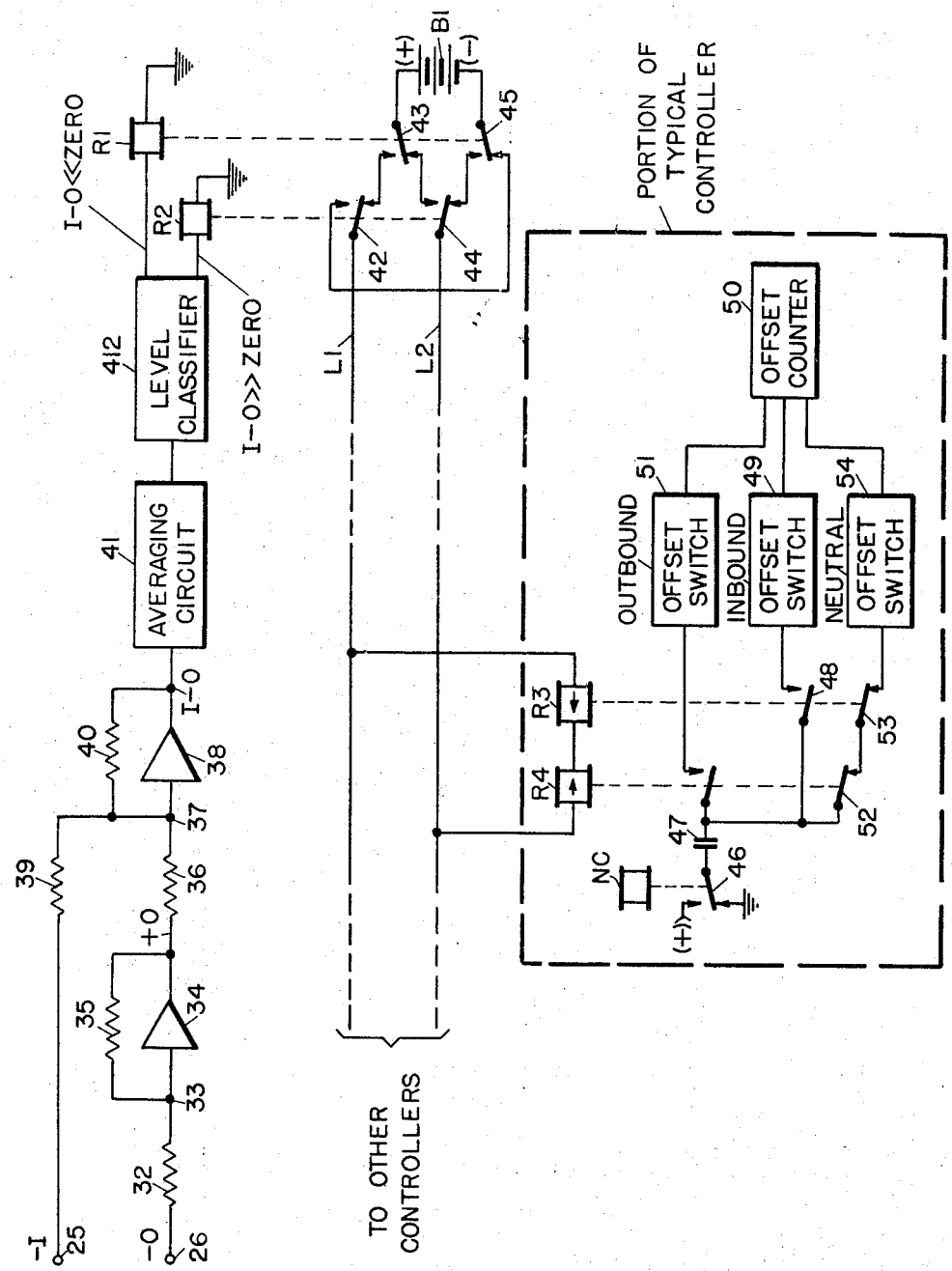
FIG. 2 is a circuit diagram illustrating one way in which a mathematical computation may be carried out using inbound and outbound lane occupancy measurements as provided in FIG. 1 to obtain an offset control parameter representing their algebraic difference.

FIG. 2 illustrates one manner in which the analogs I and O, derived in the manner shown in FIG. 1, may be used to derive a further analog signal representing their difference $I-O$, and also shows how this new analog signal may be used to select offset in a progressive signalling system.

Since both analogs $-I$ and $-O$ appearing at the input terminals 25 and 26 (corresponding to output terminals 25, 26 in FIG. 1) have like sign, it is preferable first to reverse the sign of one of these analogs to facilitate their substraction. This is accomplished by applying one of the analog signals, e.g., $-O$, through a summing resistor 32 to the summing point 33 of an operational amplifier 34 which is shunted between its output and summing terminals by a resistor 35. By choosing resistors 32 and 35 to have equal values of resistance, the voltage at the output terminal of amplifier 34 will be equal in amplitude to the input voltage $-O$ but of opposite sign, or $+O$. This amplifier output voltage is then applied through another summing resistor 36 to the summing point 37 of an operational amplifier 38 which also receives the analog signal $-I$ through summing resistor 39. Amplifier 38 is shunted by a resistor 40 which preferably has a resistance equal to that of resistors 36 and 39. Since the input to amplifier 38 comprises $+O$ and $-I$, and since there is a 180° phase reversal taking place in the amplifier, the output voltage will be proportional to the algebraic sum of the two input voltage, i.e., $I-O$.

When a traffic congestion parameter such as lane occupancy is used to control traffic, it is generally not desired that each slight, and perhaps temporary, change in traffic congestion initiate a change in system control through its effects upon the congestion parameter. The system may be said to have a considerable amount of "mass" in that there is a rather significant delay between the initiation of a change in the measurement of lane occupancy, for example, and the correction of the traffic stream which originally brought about the change in measured lane occupancy. Because of this, it is not desired that every slight change in measured lane accupancy should result in a change in system control; instead, short-term variations should preferably be considered as random background noise and effectively removed by longer time averaging. This is accomplished in the apparatus of FIG. 2 by supplying the output voltage of amplifier 38 to a long time constant averaging circuit 41. This averaging circuit, whose time constant may be in the order of five to ten minutes or more, supplies its output voltage to a level classifier 41a which classifies the amplitude of the $I-O$ signal into three different levels for selective energization of relays R1 and R2. Thus, $I-O$ is positive and exceeds zero by at least some predetermined amount, indicating that inbound lane occupancy is considerably greater than outbound lane occupancy, relay R2 is energized and relay R1 is dropped away. If, on the other hand, $I-O$ is negative, and its absolute amplitude exceeds zero by a predetermined amount, indicating that outbound lane occupancy is substantially greater than inbound lane occupancy, relay R1 is picked up and relay R2 is dropped away. Between these limits, where the difference $I-O$, whether positive or negative, is less than the predetermined amount, indicating that inbound and outbound lane occupancies do not differ greatly, neither relay R1 nor R2 is picked up.

In the prior application of H. C. Kendall et al., Ser. No. 239,714, filed Nov. 22, 1962, now Patent No. 3,252,-133, dated May 21, 1966, and assigned to the assignee of the present application, there is disclosed a digital system for controlling any number of local intersection controllers from a central office. A selected portion thereof has been shown diagrammatically in FIG. 2 in order to disclose how the selective energization of relays such as relays R1 and R2 can be used to govern the offset selection in effect at any time throughout the system.

As shown in FIG. 2, a battery B1 is connected through pole-changing contacts of relays R1 and R2 to line wires L1 and L2 which extend from the central office to each intersection controller. If relay R1 is picked up because outbound lane occupancy O exceeds inbound lane occupancy I by more than a predetermined amount, line wire L1 is connected through back contact 42 of relay R2 and front contact 43 of relay R1 to the positive terminal of battery B1, and line wire L2 is then connected through back contact 44 of relay R2 and front contact 45 to the opposite, negative terminal of battery B1. With wire L1 positive and wire L2 negative, only the polar line relay R3 at each controller is energized, since, as indicated by the arrow associated with the symbol for this relay, the assumed polarity of line voltage will cause current to flow in the proper direction through the winding of relay R3 but not through the winding of relay R4 so that relay R4 will remain dropped away.

As described in detail in the prior copending application Ser. No. 239,714, a distinctive synchronizing pulse is transmitted once each signal cycle from the central office to each individual controller, and the occurrence of this synchronizing pulse not only has the effect of correcting for any timing errors at an individual controller location but also establishes a reference or system time zero of a system-wide "background" cycle, with respect to which any intersection controller may be "offset" by a predetermined amount in order to establish a desired phase relationship of its local signal cycle relative to that of other local controllers.

In application Ser. No. 239,714, it is disclosed that the occurrence of the synchronizing pulse causes relay NC at each controller to be energized momentarily. When this happens, front contact 46 of this relay is momentarily closed and a circuit is completed to charge capacitor 47 through a particular one of the offset switches 51, 49, or 54, with the particular offset switch which is selected being dependent upon the actuated conditions of relays R3 and R4. Under the assumed condition, relay R3 is picked up and relay R4 is dropped away so that the pulse of charging current through capacitor 47 is applied through front contact 48 of relay R3 and through offset switch 49 to offset counter 50. Offset switch 49 is manually pre-set to some predetermined count corresponding to a particular step of counter 50. When the synchronizing pulse is received and applied to counter 50 through switch 49, counter 50 is operated to such particular step regardless of what step it might have been on therebefore, and thereafter it steps through successive cycles with each one phase-displaced or "offset" from the background cycle demarcated by the synchronizing pulses to an extent dependent upon the locally adjusted setting of switch 49.

Upon a change in the relative values of I and O such that there is a change in the actuated conditions of relays R3 and R4, the synchronizing pulse occurring at system zero time will be applied to counter 50 through a different offset switch which may be pre-set to a different count, thereby establishing a different offset of the local signal cycle relative to the background cycle.

To illustrate, if offset counter 50 operates through 100 counts on each signal cycle, offset switch 49 may, for example, be set at count 30. When relay NC picks up at system time zero, the resultant charging current of capacitor 47 applied through front contact 48 of relay R3 will operate counter 50 to its No. 30 step, thereby establishing a desired phase relationship between the signal cycle which is demarcated by this counter 50 and the overall system or "background" cycle whose beginning and end is demarcated by a momentary actuation of relay NC in response to the synchronizing pulse.

In a manner analogous to that just described, if relay R1 at the central office were picked up rather than relay R2, then relay R4 at each controller would be energized instead of relay R3. Under these circumstances, upon the occurrence of the synchronizing pulse establishing system time zero and actuating relay NC, offset counter 50 would be operated to a predetermined count dependent entirely upon the preset position of outbound offset switch 51. If both relays R3 and R4 were dropped away because of a nearly equal inbound and outbound lane occupancy situation, then both back contacts 52 and 53 of relays R4 and R3 would be closed with the result that counter 50 would then be operated at system time zero to a predetermined count governed in accordance with the preselected position of neutral offset switch 54. It follows, therefore, that the local signal cycle demarcated at each controller by its offset counter 50 may be controlled to have any of three previously selected phase relationships with respect to the overall system cycle, with the particular phase relationship that is in effect at any time being dependent upon the actuated conditions of relays R3 and R4 and thus dependent upon conditions of relays R1 and R2. Since relays R1 and R2 are selectively energized in accordance with the difference between inbound and outbound lane occupancies, i.e., I—O, it follows that this computed difference I—O directly controls which of the several available, locally adjusted offsets shall be in effect at any time throughout the system.

A system which selects offset based upon the difference of inbound and outbound lane occupancies as in FIG. 2 has the disadvantage that offset is selected only in accordance with the difference in lane occupancies without taking into account their absolute values. More specifically, a predetermined differential between inbound and outbound lane occupancies may result in the selection of a preferential offset favoring the direction of traffic having the greater lane occupancy and yet this may be undesirable since, despite the differential, both values of lane occupancy may be quite high so that a non-preferential offset should be in effect. As an example, when inbound lane occupancy I equals 20 percent and outbound lane occupancy O equals five percent, the difference between the two, 20 percent, is quite substantial and, since outbound lane occupancy is quite low, traffic congestion can undoubtedly be lessened by putting into effect an inbound preferential offset. However, if inbound and outbound lane occupancies increase to 70 percent and 20 percent, respectively, it may be quite desirable that a non-preferential offset should be in effect even though there is again a differential of 20 percent between the two values since an inbound preferential offset might unduly aggravate the already high congestion being experienced by outbound traffic.

The foregoing considerations suggest that a control parameter based upon the ratio of inbound and outbound lane occupancies would be a more satisfactory index of the desirability of establishing a preferential offset. Accordingly, there is shown in FIG. 3 a system whereby one may perform arithmetic operations upon the inbound and outbound lane occupancy parameters I and O, derived as in FIG. 1, to derive a a new offset control parameter representing the ratio of inbound to outbound lane occupancies $I/O$.

To derive the ratio of $I/O$, $-O$ is first converted to $+O$ through the use of operation amplifier 61. By selecting input and feedback resistors 60 and 62, respectively, to be of equal value, the output voltage of operational amplifier 61 is equal in amplitude to the input voltage $-O$ but of opposite sign so that $+O$ is applied as one input to multiplier 66.

Since terminal 25 receives the negative of the inbound lane occupancy value $-I$, and this is applied to the amplifier 64 summing terminal through resistor 63, and recognizing that a characteristic of an operation amplifier such as amplifier 64 is that the voltage at its summing terminal must be substantially zero, it follows that the summing terminal must receive $+I$ through resistor 65. If the output of multiplier 65 is to provide $+I$ while one of the multiplier inuts from amplifier 61 must be $+O$, it follows that the output of amplifier 64 which is applied as another multiplying input to multiplier 66 must be $I/O$. In other words, if multiplier 66 receives inputs $+O$ and $$+\frac{I}{O}$$

its output must be $+I$ which, together with the $-I$ input received from terminal 25, results in substantially zero input for amplifier 64, thereby meeting the required conditions at the input to amplifier 64.

The $$+\frac{I}{O}$$

output of amplifier 64 is averaged in averaging circuit 67 which has a long time constant to remove short-term variations in the computed ratio $I/O$. The average output of averaging circuit 67 is then applied to level classifier 68 which selectively energizes R1 and R2 according to the amplitude of $I/O$. If I substantially exceeds O, the ratio will be greater than one and the level classifier 68 will respond to the relatively high level of its input signal by energizing both relays R1 and R2. When I and O are more nearly equal in value, the ratio $I/O$ will tend toward the value of unity, and this lower level of input to level classifier 68 will result in the energization of relay R2 but not of relay R1. When O substantially exceeds I the ratio $I/O$ becomes quite small, substantially less than unity, and this level of input to level classifier 68 will result in the energization of neither of relays R1 and R2.

If it is assumed that an inbound preferential offset is desired to be put into effect when I, for example, is greater than O by a factor of 2 to 1 or more, level classifier 68 can be so organized that for values of the output of amplifier 64 representing a value of the ratio of two or more, both relays R1 and R2 will be picked up, with the result that line wire L1 is then connected to the $(+)$ terminal battery B2 through front contacts 69 and 70 of relays R2 and R1, respectively. At the same time, line wire L2 will be connected to the $(-)$ terminal of the battery through front contacts 71 and 72 of these same relays. From the description which was given in connection with FIG. 2, it will be evident that this polarity of energization applied to line wires L1 and L2 will result in the energization of polar relay R3 at each local controller, thereby resulting in an inbound preferential offset being put into effect.

When outbound lane occupancy substantially exceeds inbound lane occupancy by the same degree, i.e., a factor of 2 to 1 or more, the value of the ratio $I/O$ will be equal to, or less than, 0.5, and the correspondingly low level of input signal to level classifier 68 will permit the energization of neither relay R1 nor relay R2. Under these circumstances, line wire L1 is connected through back contact 69 of relay R2 to $(-)$ terminal of battery B2, while line wire L2 is connected through back contact 71 of relay R2 to the $(+)$ terminal of this same battery. As a result, relay R4 at each local controller will be energized and this will result in an outbound preferential offset being put into effect throughout the system.

For values of the ratio $I/O$ which lie between 0.5 and 2, level classifier 68 will energize relay R2 but not relay R1. Therefore, line wire L1 will be connected through front contact 69 of relay R2 to the heel of contact 70 of relay R1, and line wire L2 will similarly be connected through front contact 71 of relay R2 to the heel of contact 72 of relay R1. Since both contacts 70 and 72 of relay R1 will now be open, line wires L1 and L2 will be de-energized so that both relays R3 and R4 at each local controller will also be de-energized. Under these circumstances, a neutral or non-preferential offset will be put into effect throughout the system.

An offset control parameter which produces results similar to $I/O$ but which is more convenient to use in the control of offsets, is the parameter of $$\frac{I}{I+O}$$

This parameter is preferable to $I/O$ because it varies between fixed limits of zero to one hundred percent rather than from zero to infinity as does $I/O$. As a result, it is more feasible to provide a computer which will be designed to compute the ratio $$\frac{I}{I+O}$$

over its entire range of possible values. Moreover, the mid-range of $$\frac{I}{I+O}$$

or 50 percent represents the neutral traffic condition wherein inbound and outbound lane occupancies are equal and a non-preferential offset is ordinarily to be put into effect. Still another advantage of $$\frac{I}{I+O}$$

is that a given differential of values of I and O represents the same degree of unbalance of the ratio $$\frac{I}{I+O}$$

from the 50 percent point regardless of the direction of unbalance. As an example, if inbound lane occupancy I is twice outbound lane occupancy O (i.e., $I=2\times O$), the ratio $$\frac{I}{I+O}$$

will equal 66⅔%; similarly, if $O=2I$, the value of $$\frac{I}{I+O}$$

will equal 33⅓%. In each case, the amount of unbalance from the 50% mid-point is 16⅔%.

The block diagram of FIG. 4 illustrates how the ratio $$\frac{I}{I+O}$$

may be computed from the derived values of $-I$ and $-O$ obtained as shown in FIG. 1. The value $-I$ is applied to the summing terminal of an operational amplifier 75 through resistor 76. The value $-I$ is also applied to the summing terminal of operational amplifier 77 through resistor 78. This same summing terminal of amplifier 77 receives $-O$ through input summing resistor 79. Since resistors 78, 79, and amplifier feedback resistor 80 all have equal values of resistance, the voltage at the output terminal of amplifier 77 is proportional to $I+O$.

Because amplifier 75 receives the $-I$ signal at its summing terminal from terminal 25, it must receive a $+I$ input through input resistor 82 from multiplier 81. Also, since multiplier 81 receives as one of its multiplied input signals the parameter $I+O$ from the output of amplifier 77, the other input of multiplier 81 must be $$\frac{I}{I+O}$$

obtained from the output of amplifier 75. The parameter $$\frac{I}{I+O}$$

appearing at the output of amplifier 75 is applied to an averaging circuit 83 which removes short-term variations in the computed parameter and supplies the time-averaged output to a level classifier 84 which selectively energizes relays R1 and R2. It will be appreciated that the output of amplifier 75, although representing a percentage value of the ratio $$\frac{I}{I+O}$$

is actually a voltage variable from zero to some predetermined upper reference level. More specifically, if the level of the (+) voltage of FIG. 1 is one hundred volts, this is the level that will be assumed by I if relay 1A were picked up 100% of the time. Under such conditions, both I and O will vary over the range of 0–100 volts as will also the ratio of $$\frac{I}{I+O}$$

Assuming again that an inbound preferential offset is to be put into effect when inbound lane occupancy I exceeds outbound lane occupancy O by a factor of 2 to 1 or more, this means that level classifier 84 should energize relay R1 when $$\frac{I}{I+O}$$

exceeds 67% (i.e., 67 volts when the reference level is 100 volts according to the example given). Similarly, values of the ratio which are equal to or less than 33 percent (33 volts) will be ineffective to pick up relay R2. Thus, neither of the relays is energized for these lower levels of $$\frac{I}{I+O}$$

when its value is less than 33%; whereas, both are energized when $$\frac{I}{I+O}$$

exceeds 67 percent. For values of $$\frac{I}{I+O}$$

which lie between 33% and 67%, relay R2 is energized but relay R1 is de-energized. The relative actuated conditions of relays R1 and R2 are thus similar to those of FIG. 3 with the result that a similar arrangement of the contacts of these relays may be employed to selectively energize line wires L1 and L2. Because of this similarity, the circuit for providing this energization of line wires has not been repeated in FIG. 4.

One aspect of our invention is the derivation of various traffic control parameters such as, for example, the ratio $I/O$ $$\frac{I}{I+O}$$

et cetera, directly from the vehicle presence information provided by the vehicle detectors without first having to compute the several components making up these parameters, i.e., without the need, for example, to compute I or O individually.

FIG. 5A illustrates apparatus of the general type for use in deriving these parameters and is disclosed primarily to facilitate an explanation of the principles involved. FIGS. 5B, 6A, 6B, 7, and 8 illustrate apparatus which is generally similar to that of FIG. 5A but has been adapted to meet specific requirements.

In FIG. 5A, operational amplifier 88 is provided with a shunt capacitor 89 and a plurality of input and feedback networks, each of which is controlled by the contact of a respective relay. All of the relays shown, 1A, 2A, 1B, 2B, 3B, 1C, and 2C are assumed to be vehicle presence detector relays or repeaters of such relays so that each relay is at times picked up for an interval dependent upon the time required for a vehicle to pass through the detection zone associated with the respective vehicle detector. It is further assumed that relays 1A and 2A comprise the output relays of presence-type detectors which are all associated with one particular lane of traffic; relays 1B–3B are similarly associated with vehicle presence detectors for a different lane of traffic, and relays 1C and 2C are associated with the vehicle detectors for a still different lane.

If $P_{1A}$ represents the percentage pickup time of relays 1A, $P_{2A}$ the percentage pickup time of relay 2A, $P_{1B}$ the percentage pickup time of relay 1B, et cetera, then $P_{1A}$ is the lane occupancy as measured at the vehicle detector location associated with relay 1A, $P_{2A}$ is the lane occupancy as measured at the corresponding vehicle detector associated with relay 2A, et cetera. It is further assumed that the voltage $E_1$ is a predetermined reference voltage such as 100 volts and that voltage $E_2$ is the amplifier output voltage. Operational amplifier 88 controls its output voltage $E_2$ in such a manner that the voltage at the amplifier summing terminal is substantially zero. As with all such operational amplifiers, the input current to the amplifier itself is negligible.

At any time, the charge Q on capacitor 89 may be represented by the following expression:

$$Q = CE_2$$

where C is the capacitance of capacitor 89. Throughout a specific time interval T over which the previously mentioned percentage detection times are measured, any change which occurs in the voltage $E_2$ must be matched by a corresponding change in the amount of charge Q on capacitor 89. In other words, (1) $$\Delta E_2 = Q/C$$

Obviously, with increasing values of capacitance C, the change of $E_2$ over time T, corresponding to a given amount of change in $Q_1$, i.e. $\Delta E_2$, is reduced.

The value of $\Delta Q$ over time T is the algebraic sum of the individual amounts of A which are applied to the amplifier summing terminal through the various circuit paths leading thereto, some being input networks extending from the source of reference voltage $E_1$, and other comprising feedback networks extending between the amplifier output and input terminal. With respect to any one of these input or feedback networks, such as that extending, for example through front contact 90 of relay 1A, the increment of change contributed to the amplifier summing terminal may be represented by $Q_{1A} = i_{1A} t_{1A}$ where $i_{1A}$ is the current which flows to the amplifier summing terminal through resistor 91 when front contact 90 of relay 1A is closed and $t_{1A}$ is the cumulative amount of time that contact 90 is closed during time interval T. Also, $i_{1A} = E_1/R_A$, where $R_A$ is the resistance value of resistor 91. Moreover, time $t_{1A}$ is the product of the percentage time of closure of contact 90 and time interval T, or $t_{1A} = P_{1A}T$. As a result, the increment of charge which is applied to the amplifier summing terminal through the particular input network associated with contact 90 over time T may be represented by $$Q_{1A} = E_1 T \frac{P_{1A}}{R_A}$$

Similar equations may be established for each of the other input or feedback networks for amplifier 88, as for example:

$$Q_{1B} = E_1 T \frac{P_{1B}}{R_B}$$

$$Q_{2B} = E_1 T \frac{P_{2B}}{R_B}$$

where $R_B$ is the resistance value of each of the resistors 92, 93 associated, respectively, with the "B" relays 1B, 2B.

$$Q_{1C} = E_1 T \frac{P_{1C}}{R_C}$$

et cetera, where $R_C$ is the resistance value of each of the resistors 94, 95 associated, respectively, with the "C" relays 1C, 2C.

Adding the values of charge Q which flow through all the input or feedback networks to the amplifier summing terminal yields the equation:

(2)
$$\Delta Q = E_1 T \frac{P_{1A} + P_{2A}}{R_A} + E_2 T \frac{P_{1B} + P_{2B} + P_{3B}}{R_B} + E_2 T \frac{P_{1C} + P_{2C}}{R_C}$$

From Equation 1 above, it is seen that the change in voltage $E_2$ occurring in time T is a function of the change in charge Q, whereas Equation 2 above shows that the change in charge Q, $\Delta Q$, is in turn a function of $E_2$. If the capacitance C is increased to a sufficiently large value, the change of $E_2$ which will occur during interval T will be reduced sufficiently so that the value of $\Delta Q$ obtained with Equation 2 by assuming that there is no change in $E_2$ will be within a fraction of a percentage of the actual value. If it is further assumed that the repetitive operation of the various relay contacts in the input and feedback networks remains substantially uniform for a sufficiently long time period, then the value of voltage $E_2$ will approach an equilibrium value to a sufficient degree that, during any given time interval T, $\Delta Q$ may be assumed to be zero. Then, assuming that $\Delta Q$ equals zero, there may be derived from Equation 2 an expression for the amplifier output voltage $E_2$ as follows:

(3)
$$E_2 = -E_1 \frac{\frac{P_{1A} + P_{2A}}{RA}}{\frac{P_{1B} + P_{2B} + P_{3B}}{RB} + \frac{P_{1C} + P_{2C}}{RC}}$$

In FIG. 5A, there are two "A" relays, i.e., relays 1A and 2A; three "B" relays; and two "C" relays. If the resistance in any input or feedback network of the amplifier is chosen to have a value proportional to the number of associated relays, such that, when applied to the circuit of FIG. 5A, for example $R_A = 2_R$, (where R equals one unit of resistance), $R_B = R_C = 2_R$, Equation 3 above becomes:

(4)
$$E_2 = -E_1 \frac{\frac{P_{1A} + P_{2A}}{2}}{\frac{P_{1B} + P_{2B} + P_{3B}}{3} + \frac{P_{1C} + P_{2C}}{2}}$$

Equation 4 shows that the amplifier output voltage now is proportional to the average percentage pickup time of the A relays divided by the sum of the average percentage pickup times of the B and the average percentage pickup times of the C relays.

Since the several groups of A, B, and C relays are assumed to be the individual output relays of respective groups of vehicle presence detectors, each group being associated with a respectively different lane, it follows that amplifier output voltage $E_2$ is proportional to the average lane occupancy of the lane associated with the A detectors divided by the sum of the average lane occupancies of the lanes associated, respectively, with the B and C detectors.

FIG. 5B illustrates a modification of the circuit of FIG. 5A which is especially adapted to the computation of the offset control parameter I/O, i.e., the ratio of inbound and outbound lane occupancies. In FIG. 5B, operational amplifier 97 is shunted by capacitor 98 and is provided with a plurality of input and feedback networks in a manner similar to that disclosed for amplifier 88 of FIG. 5A.

In FIG. 5B, the input networks are controlled by four individual inbound presence detector relays 1A–4A, and the feedback networks are respectively controlled by four different outbound presence detector relays 1B–4B. By having all input resistors 99–102 of equal resistance value, each of the artery inbound relays 1A–4A has the same effect in the computation of I/O. All resistors 103–106 have the same value of resistance as well so that the relays 1B–4B all will have the same degree of effectiveness. Also, since there are an equal number of inbound and outbound detectors, each of the resistors 99–102 has a resistance value equal to that of any of resistors 103–106. However, in accordance with the description given in connection with FIG. 5A, it will be appreciated that this equality of resistance values for the input and feedback networks of FIG. 5B occurs only because of there being an equal number of input and feedback networks; where the input and feedback networks are unequal in number, the respective resistance values will vary and will, in each case, be proportional to the number of associated networks. Thus, if there were four artery inbound detectors and thus four input networks as shown in FIG. 5B but only two artery outbound detectors and thus only two feedback networks, then each resistor 99–102 would be selected to have twice the resistance value of any of the resistors included in the feedback networks in order that the outbound traffic would have equal weight with the inbound traffic in computing I/O.

In accordance with the detailed analysis already presented with respect to the circuit of FIG. 5A, it will be apparent that the output voltage of amiplifier 97 will have its amplitude vary in proportion to the average of the percentage pickup times of the several inbound presence detector relays 1A–4A (average inbound lane occupancy) divided by the average of the percentage pickup times of the outbound presence detector relays 1B–4B (average outbound lane occupancy).

As with the several previously-described embodiments of the invention, the computed ratio I/O obtained from amplifier 97 is time-averaged by averaging circuit 107 whose output is applied to level classifier 108 which selectively energizes relays R1 and R2 according to the value of the computed parameter I/O. A circuit similar to that shown in FIG. 3 may be used to selectively energize the line wires to put into effect an appropriate offset for the system according to the actuated conditions of these relays R1 and R2.

FIGS. 6A and 6B illustrate a still different modification of the circuit of FIG. 5A which is adapted for the computation of the offset control parameter $$\frac{I}{I+O}$$

This embodiment of our invention also illustrates how compensation may be provided to account for a variable number of presence detectors.

The actual computation is effected by operational amplifier 110 which is shunted by capacitor 111. Each of the four inbound presence detector relays 1A–4A shown has one contact which is capable of selectively closing a respective input network to amplifier 110 and a second contact for selectively closing a respective feedback network. More specifically, considering relay 1A as a typical one of the four relays 1A–4A, front contact 112 of this relay, when closed, completes an input network to the summing terminal ST of amplifier 110 through resistors 113, 114, 115, and 116. Relay 1A also is provided with a contact 117 which, when closed, completes a feedback network for amplifier 110 extending from its output terminal to the summing terminal ST through resistors 118, 119, 120 and 121. Each of the remaining relays 2A, 3A and 4A similarly closes both an input network and a feedback network throughout the time that a vehicle is being detected by the associated vehicle presence detector.

The several outbound presence detector relays 1B–4B each have a single contact which completes a feedback network extending between the output and summing terminals ST throughout the time that a vehicle is detected by the corresponding vehicle presence detector. For example, relay 2B, when picked up, closes its front contact 122 to thereby complete a feedback network extending through resistors 123, 124, 125, and 126.

Associated with each of the relays 1A, 2A, – – – 4A is a corresponding two-position, multiple contact ganged switch 1AS, 2AS, – – – 4AS. Each of the relays 1B–4B has a similar switch associated therewith. These switches make it possible to compensate the system for the number of detectors which are in effect at any time.

When any presence detector relay is intended to be effective in computing $$\frac{I}{I+O}$$

the corresponding switch is in the solid-line position shown in the drawing, but such switch is operated instead to the dotted line position when the corresponding presence detector relay is intended to be rendered ineffective.

Assuming first that each of the four inbound relays 1A–4A is intended to be effective, then all the switches 1AS–4AS are in their upper, solid-line positions shown in the drawing. Considering, as a typical example, the input network associated with contact 112 of relay 1A, the fact that all four switches 1AS–4AS are in their solid-line position means, first of all, that contact 127 of switch 1AS is closed so that this particular input network is capable of being completed any time that relay 1A picks up and closes its contact 112. With respect to the remaining switch contacts 128, 129, and 130 of switches 2AS, 3AS, and 4AS, respectively, each of these, when in its upper, solid-line position, opens a circuit which is capable of shunting a respective one of the resistors 113, 114, and 115. Thus, under the assumed conditions, all four resistors 113, 114, 115, and 116 are included in series in this input network. Since each of these resistors is of equal value, this means that there are four units of resistance in this input network when all four inbound presence detectors are desired to be effective.

An examination of each of the remaining three input networks to the amplifier, associated respectively with relays 2A, 3A, and 4A shows that, each of these input networks is capable of being completed provided that the respective presence detector relay is picked up; moreover, in each input network there are also four units of resistance since each includes four series resistors each having a resistance value equalling that of any of the four resistors 113–116 included with the input network already described. Thus, each of the four inbound presence detectors contributes equally to the computation of $$\frac{I}{I+O}$$

The four feedback networks of FIG. 6A associated, respectively, with relays 1A–4A are similar to the input networks already described so that, under the assumed conditions where all four inbound detectors are desired to be effective and all switches 1AS–4AS are in their solid-line positions, each feedback network is closed when the respective relay 1A–4A is picked up; furthermore, in each feedback network there are four units of resistance since there are four series resistors in each path and each has a resistance value equalling that of any resistor, i.e., 113–116, in any of the input networks.

Assume now that one of the inbound vehicle presence detectors is desired to be rendered ineffective in the computation of the output parameter $$\frac{I}{I+O}$$

This may be desired when, for example, that vehicle detector is found to be defective. To accomplish this, the associated switch is operated from the normal position shown in FIG. 6A to its lower, dot-line position. Assume, for example, that the presence detector associated with relay 1A becomes inoperative. Switch 1AS is then operated to its dotted-line position which, first of all, open-circuits both the single input network and single feedback network associated with this relay. Thereafter, relay 1A can have no effect on amplifier 100 since open switch contact 127 now renders ineffective any closure of front contact 112 of relay 1A; similarly, open switch contact 147 now renders ineffective any closure of front contact 117 of relay 1A. It is not sufficient, however, merely to open circuit those input and feedback networks which are controlled by the now ineffective presence detector relay; it is additionally necessary to compensate for the loss of this particular detector by causing each of the three remaining inbound presence detectors associated with relays 2A, 3A, and 4A to have increased effect. This is accomplished by the concurrent actuation of contacts 135, 136, and 137 of switch 1AS to its dotted-line position. Thus, contact 135 in its dotted-line position now shunts resistor 138 so that there are now only three units of resistance in the input network associated with inbound presence detector relay 2A, i.e., the three units of resistance provided, respectively, by resistors 139, 140 and 141. Similarly, the resistance now effective in the input network associated with relay 3A is now also reduced to three units of resistance since switch contact 136 in its dotted-line position now shunts resistor 142, thereby leaving only resistors 143, 144, and 145 in this particular input network. In a similar manner, switch contact 137 in its dotted-line position effectively removes resistor 146 from the input network associated with relay 4A, thereby leaving only three units of resistance in this particular input network.

With respect to the feedback networks, the actuation of switch 1AS to its dotted-line position open-circuits the feedback network associated with relay 1A at now-opened contact 147; whereas, switch contacts 148, 149, and 150 of switch 1AS have the effect of reducing the resistance in each of the remaining three feedback networks from four units of resistance to three units.

It will be apparent from the analysis given with respect to the circuit of FIG. 5A that the compensation thus made by actuation of switch 1AS to its dotted-line position thus exactly counterbalances the effective loss of the single detector. This can be more readily understood when it is considered that, if two detectors are rendered ineffective by operating two of the switches to their dotted-line position, there will, in effect, be only two input networks and two feedback networks associated with the inbound presence detector relays; simultaneously, the resistance in each of the still effective feedback and input networks will now be one-half the normal value so that each remaining vehicle presence detector has twice its normal effect.

The feedback networks which are associated with the outbound presence detector relays 1B–4B are similar to those just described. Associated with each detector relay is a switch, 1BS–4BS, respectively. The manner in which actuation of any switch can render ineffective the corresponding detector and simultaneously compensate the circuit for the loss of such detector is entirely similar to that just described for the input and feedback networks associated with the inbound presence detector relays.

In a manner analogous to that already described in connection with FIG. 5A, the amplifier 110 of FIG. 6B provides an output voltage which is proportional to the average percentage pickup time of the several inbound presence detector relays I divided by the sum of the same quantity I and the average percentage pickup time of the outbound presence detector relays O; thus, the ratio $$\frac{I}{I+O}$$

is provided. More specifically, since each inbound presence detector relay controls both an input network and a fedback network, the factor of inbound lane occupancy I appears in both the numerator and denominator of the computed ratio $$\frac{I}{I+O}$$

and this is to be entirely expected since, as demonstrated in connection with FIG. 5A, the amplifier output will have represented in the numerator of the computed ratio the average percentage pickup times of those relays which, when picked up, complete an input network and will additionally have represented in the denominator the average percentage pickup times of those relays which, when picked up, complete a feedback network.

The output voltage of amplifier 110 which varies in proportion to the value of the ratio $$\frac{I}{I+O}$$

is applied to averaging circuit 155 which tends to remove the short-term variations in the value of the amplifier output. Thereafter, the averaged output $$\frac{I}{I+O}$$

is applied to a level classifier 156 which selectively actuates relays R1 and R2 in dependence upon the value of this ratio. Relay contacts of these relays R1 and R2 may be arranged in a manner similar to that shown in FIG. 3 to selectively energize line wires L1 and L2 and thereby control the offset which shall be in effect throughout the system at any time.

In the apparatus of FIGS. 6A and 6B, the switches which are respectively associated with the vehicle presence detector relay such as swich 1AS, for example, associated with relay 1A, are disclosed as being of the manually-operable type. Thus, it is contemplated that upon the failure of any one presence detector, the associated switch will be operated from the normal position shown in FIGS. 6A and 6B to the dotted line position to thereby adjust the circuit in the manner described.

In some installations, especially where a considerable number of vehicle detectors is used, it may be much preferable to provide apparatus which automatically senses when there has been a failure of any vehicle presence detector and which automatically provides the desired adjustment of the computing equipment. Such automatic apparatus is illustrated in FIG. 6C. Only a fragmentary portion of the apparatus is shown as required for the control of but a single switch associated with one vehicle presence detector relay. Thus, FIG. 6C illustrates a typical such relay 1A which selectively controls a relay 1ASR which, effectively, takes the place of the manually-operable switch 1AS that would otherwise be provided in accordance with the apparatus shown in FIGS. 6A and 6B.

In the apparatus of FIG. 6C, relay 1ASR is normally energized when the vehicle presence detector associated with relay 1A is operating in the normal manner by periodically responding to vehicles passing through its detection zone. However, if for any reason there is no vehicle detection for an unduly long time interval, this is sensed by relay 1ASR which then drops away and actuates a plurality of contacts located in respectively different input feedback loops. The exercise of such control by relay 1ASR, corresponding to the function of switch 1AS in FIGS. 6A and 6B, is illustrated in FIG. 6C by a back contact 285 of relay 1ASR which, when this relay is dropped away, shunts contact 286.

Under normal conditions, a vehicle detector is operated by successive vehicles at quite a high rate, perhaps in the order of once every few seconds. On the other hand, it is well known that, in the early morning hours, when traffic congestion is very light, a vehicle detector may not be operated for a quite considerable length of time, perhaps not for several minutes or even throughout a half-hour period. Accordingly, a clock-controlled switch 287 is illustrated in block form in FIG. 6C to account for these different conditions. More specifically, during the normal daylight hours, switch 286 energizes relay R9 and thereby maintains front contact 287 of relay R9 steadily closed. Therefore, upon each closure of front contact 288 of relay 1A, energy is applied from the (+) terminal through front contacts 288 and 287 to an RC integrating circuit having a relatively short time constant and comprising resistor 289 and capacitor 290. When detector relay 1A is dropped away, a discharge circuit for capacitor 290 is provided through back contact 288 of relay 1A. The time constant of the RC circuit comprising resistor 289 and capacitor 290 is selected so that the voltage which appears across capacitor 290 when detector relay 1A operates with its minimum expected frequency during normal daylight hours, e.g. once every minute, will be sufficient, when applied through diode 291 to the the winding of relay 1ASR, to maintain this relay energized. If, for any reason, relay 1A should fail to be operated for a length of time substantially in excess of that expected, the voltage across capacitor 290 will reduce to a level where it is no longer adequate to maintain relay 1ASR picked up.

When switch 286 deenergizes relay R9, as during the early morning hours, for example, then an alternative RC integrating or averaging circuit comprising resistor 292 and capacitor 293 is provided in the circuit. This averaging circuit has a very much longer time constant so that even quite infrequent actuations of relay 1A will maintain sufficient voltage across capacitor 293 that, when this voltage is applied through diode 294 to the winding of relay 1ASR, this relay will be maintained energized. Of course, if there is no actuation of relay 1A for a very long interval, then the voltage across capacitor 293 will reduce to a level where relay 1ASR drops away. The circuit values may be so selected that relay 1A must be actuated at least once every thirty minutes or so to maintain relay 1ASR energized during the early morning hours.

FIG. 7 illustrates a still different embodiment of our invention for computing an offset control parameter which is proportional to the ratio of the difference in inbound and outbound lane occupancy and the sum of these two occupancy values, i.e., $$\frac{I-O}{I+O}$$

This latter offset control parameter behaves in exactly the same way as the ratio $$\frac{I}{I+O}$$

but has a characteristic which may facilitate its use in certain types of computing apparatus. This characteristic is that of varying about a value of zero rather than varying about a median value of 50%. Thus, it is apparent that when inbound and outbound lane occupancies are equal, the value of $$\frac{I-O}{I+O}$$

will equal zero, whereas if inbound lane occupancy were to be 100 percent and outbound lane occupancy zero percent, the ratio would equal +100%. At the other extreme, where I is zero and O equals 100%, the ratio would equal −100T. In many types of computing apparatus, it is preferable to use a parameter varying above and below a median value of zero and, if so, it is then preferable to use the apparatus of FIG. 7.

The computing apparatus of FIG. 7 comprises an operational amplifier 260 which is shunted by capacitor 261 and is provided with a plurality of input and feedback networks. Since the factors of inbound lane occupancy I and outbound lane occupancy O appear in both the numerator and denominator of the computed ratio, it is to be expected that each artery inbound presence detector relay as well as each outbound artery relay presence detector will control both an input network and a feedback network.

The factor +I is provided in the numerator by the two input networks associated with the artery inbound presence detector relays 1A and 2A. Of these, the network extending from the $+E_1$ terminal, through front contact 262 of relay R1, and summing resistor 263, to the summing terminal ST is typical. Throughout each time that a vehicle is detected by the associated vehicle presence detector, a positive increment of charge flows to the summing terminal through this input network.

The factor −O is accounted for by providing an input network for each artery outbound presence detector relay from the $-E_1$ voltage terminal and through a respective relay contact and summing resistor to summing terminal ST. A typical one of these circuits is that which is completed from the terminal $-E_1$, through front contact 266 of relay 1B and summing resistor 267, to terminal ST. Of course, both the reference voltage sources designated $+E_1$ and $-E_1$ provide the same absolute value of voltage but of opposite sign, and it is for this reason that both these factors I and −O have the same scale factor in the computed ratio although they have the opposite sign by reason of the opposite polarities of the two reference voltages employed.

To obtain the factor +I in the denominator, a feedback network is established through a contact of each of the artery inbound presence detector relays 1A and 2A and through a corresponding summing resistor to the summing terminal ST. A typical one of these feedback networks is the one which is established from the output terminal of amplifier 260, over lead 270, through front contact 264 of relay 1A, through resistor 265 to terminal ST. A similar feedback network is associated with each of the artery outbound presence detector relays 1B, 2B, and 3B as represented, for example, by the feedback network established selectively through front contact 268 of relay 1B and summing resistor 269 to terminal ST.

In each input and feedback network, the resistance value provided by the corresponding summing resistor is proportional to the number of inbound or outbound presence detector relays, respectively, which are in use. Thus, referring to FIG. 7, wherein two inbound detector relays and three outbound detector relays are shown, each input and feedback network associated with an inbound detector relay has two units of resistance, while each input and feedback network associated with one of the artery outbound detector relays has three units of resistance.

In order to simplify the drawing of FIG. 7, there has been omitted therefrom the switches which provide for compensation for a variable number of detectors; however, it should be understood that an arrangement of switches and series-connected resistors may be included in each of the input and feedback networks in the manner shown in FIGS. 6A and 6B to provide such compensation if desired.

From the description presented thus far with respect to the system of FIG. 7, and in the light of the mathematical analysis presented in connection with the circuit of FIG. 5A, it can be understood that the output voltage of amplifier 260 is proportional to the ratio $$\frac{I-O}{I+O}$$

This voltage is then applied, in a manner similar to that shown in FIG. 6B to an averaging circuit, a level classifier, and offset control apparatus in order that an offset may be put into effect throughout the system which is governed in accordance with the current value of $$\frac{I-O}{I+O}$$

Since the ratio $$\frac{I-O}{I+O}$$

varies above and below zero as dies the value $I-O$ computed by the embodiment of our invention illustrated in FIG. 2, the relays which are selectively controlled in accordance with the value $$\frac{I-O}{I+O}$$

may have their contacts arranged in the manner shown in FIG. 2 to provide for selective energization of line wires L1 and L2.

FIG. 8 illustrates a still further modification of the basic apparatus shown in FIG. 5A and is particularly adapted for the computation of a parameter useful in selecting cycle split, i.e., the relative durations of the proceed indications displayed to the cross street and artery respectively.

In the apparatus of FIG. 8, relays 1C and 2C are associated with vehicle presence detectors that detect vehicles approaching the intersection and traveling on a cross street. Where two such relays 1C and 2C are provided as shown in FIG. 8, one relay may be associated with a vehicle detector which detects the presence of vehicles on the cross street and approaching the intersection from one direction, while the other relay may similarly be associated with a vehicle presence detector which is situated to respond to vehicles on the same cross street but approaching the intersection from the opposite direction. Relays 1A and 2A are detector relays associated with one or more inbound traffic lanes, and relays 1B and 2B are similarly associated with detectors that detect traffic in the outbound lanes.

The circuit arrangement of FIG. 8 is very similar to that of FIG. 5A. Each of the cross street presence detector relays 1C and 2C, respectively, control both an input and a feedback network for the operational amplifier 157 which is shunted by capacitor 158. More specifically, relay 1C has a front contact 159 which, when closed, is capable of completing an input network extending from the $E_1$ reference voltage source, through resistors 160 and 161 to the amplifier summing terminal ST. This same relay 1C controls the selective closure of a feedback network extending from the amplifier output terminal and over lead 162, through front contact 163, and resistors 164 and 165 to the terminal ST. Each of the inbound presence detector relays 1A and 2A selectively completes a feedback network between the output terminal and summing terminal ST of amplifier 157, and a similar feedback network is selectively closed by respective contacts of the artery outbound presence detector relays 1B and 2B.

Associated with each of the detector relays is a switch having a plurality of ganged contacts which provides for the compensation of the input and feedback networks to account for a variable number of presence detector relays. This feature of the system of FIG. 8 is similar to that already described in connection with FIGS. 6A and 6B and thus will not be repeated in detail here. Basically, the function of these switches is to open any input or feedback network associated with a presence detector relay which is ineffective or otherwise sought to have no effect in the determination of the output parameter computed by amplifier 157 and it has the further function of affecting the resistance value in each of the associated networks to render more effective the remaining presence detector relays which continue to remain operable in the system.

Since the cross street presence detector relays 1C and 2C control both input and feedback networks of amplifier 157, whereas the artery inbound and artery outbound presence detector relays control only the feedback networks, the parameter appearing at the output of amplifier 157 is proportional to the ratio of cross street lane occupancy $c$ divided by the sum of cross street occupancy $c$ and the average of the inbound and outbound lane occupancies or $$\frac{c}{c+\frac{1}{2}(I+O)}$$

This cycle split parameter wherein the factor $c$ is, in effect, compared to the sum of itself and the average of inbound and outbound lane occupancies may be used to control the percentage portion of the cycle time which should be allotted to the cross street traffic.

Both inbound lane occupancy I and outbound lane occupancy O have individually only one-half the influence of the cross street lane occupancy C in the computed ratio and this is done, of course, in order that cross street occupancy can be compared with the average of the inbound and outbound artery occupancies. To produce this decreased effectiveness of inbound and outbound lane occupancy, the resistance values used in the feedback networks controlled respectively by the inbound and outbound presence detector relays have twice the resistance value of the resistors used in the input and feedback networks associated with the cross street detector relays. For example, resistor 166 has twice the resistance value of resistor 161, and resistor 167 similarly has twice the resistance value of resistor 160.

It should be noted that the feedback networks of FIG. 8 are so arranged that those which are associated with the artery inbound presence detector relays are treated separately as a group from the similar feedback networks associated with the artery outbound presence detector relays. This has the effect of separately averaging all of the inbound detector signals as well as all of the outbound detector signals to thereby compute I and O individually before obtaining a resulting average of the two. This arrangement is preferred to that of averaging all of the results from all of the artery detectors together since it permits a different number of detectors to be used on the inbound and outbound lanes. For example, it then becomes entirely feasible to have one inbound presence detector relay so that there is only one A relay, i.e., relay 1A and four artery outbound presence detector relays, i.e., 1B, 2B . . . 4B. In that case, and assuming that all the detectors are effective so that all the switches 1AS, 2AS, 1BS, et cetera, are in their normal position as shown in the drawing, there would then be one unit of resistance in the single feedback network associated with the single artery inbound relay 1A and four resistors, comprising four units of resistance in each of the feedback networks associated with the relays 1B and 4B. In other words, each of the four artery outbound detectors will then have one-fourth the effect of the single inbound detector, thereby preserving the proper balance in the system in that undue influence will not be accorded to the outbound lane merely because it has more detectors than the inbound lane.

The output of amplifier 157 is again averaged by an averaging circuit 170 to remove short-term variations, and the output of this averaging circuit is then in turn applied to level classifier 171 which selectively energizes relay R5 in accordance with the amplitude of the computed ratio provided by amplifier 157. When the ratio is high, indicating that cross street occupancy is assuming significant proportions relative to artery occupancy, relay R5 is picked up and line wires L3 and L4 are energized. On the other hand, if the computed value is low, thereby indicating that cross street occupancy is of a minor value compared to artery occupancy, relay occupancy, relay R5 is deenergized so that its front contacts 172 and 173 are open, with the result that line wires L3 and L4 are deenergized.

A portion of the digital control system of the previously-mentioned copending application S.N. 239,714 which particularly relates to the selection of cycle split is shown in block diagram form in FIG. 7. A local counter 174 operates repeatedly through successive cycles and thereby demarcates the local signal cycle which begins and ends upon the zero count of this counter. Where two alternative cycle splits are desired to be available for remote selection from the central office, two split switches 175 and 176 are provided and these may be locally adjusted to provide a split of the local signal cycle at a predetermined percentage point of such cycle. Thus, if local counter 174 steps through 100 successive counts for each local cycle, switch 175 may be set at "60" and split switch 176 may be set at "75." If relay R6 is energized as the result of the energization of relay R5 in response to a high level of cross street occupancy $c$ relative to average artery occupancy $$\frac{I+O}{2}$$

front contact 177 of relay R6 will be closed so that a pulse will be routed from local counter 174, through split switch 175 and front contact 177 to amplifier 178 each time that counter 174 reaches count "60." Therefore, split relay SR will be momentarily energized once each cycle, and this will occur only when local counter has advanced to count "60" representing the 60 percent point of the local signal cycle. Assuming that the momentary actuation of split relay SR that results has the effect of terminating the artery proceed portion of the cycle and starting the cross street proceed portion, the fact that switch 175 was set at count "60" means that 40% of the cycle is being allotted to proceed indications for the cross street phase. If relay R6, on the other hand, is dropped away as a result of the deenergization of relay R5 stemming from a low cross street occupancy as compared to artery occupancy, amplifier 178 will receive an input pulse when local counter 174 reaches the preset position of switch 176 which is count "75" thereby terminating the artery green phase at later time in the cycle and allotting a smaller portion, i.e., 25% of the signal cycle to the cross street.

FIGS. 9A, 9B, and 9C illustrate how the various features of our invention disclosed thus far may be combined into one composite system for the control of cycle length, cycle split, and offset for an entire progressive signalling system.

An integrating operational amplifier 180 which is shunted by capacitor 181 together with the various relays, relay contacts, and switches associated with this amplifier 180 comprise the cycle length computing portion of the system. This portion of the system is so organized that amplifier 180 may alternatively provide at its output terminal a voltage representative of the average of inbound and outbound lane occupancy $$\frac{I+O}{2}$$

or only inbound lane occupancy $I$, or only outbound lane occupancy $O$. For the detection of outbound vehicles, two vehicle detectors having corresponding relays 1B and 2B are shown to be associated with the outbound traffic lane or lanes. Similarly, three inbound presence detector relays 1A, 2A, and 3A are shown, corresponding to each of three individual vehicle presence detectors associated with the inbound artery lane or lanes.

Two relays N and T are provided to select which of the several alternative parameters shall be computed by amplifier 180 at any given time. Under normal, reasonably light traffic conditions, it is desired that both inbound and outbound lane occupancy should be taken into account in determining cycle length and thus preferably $$\frac{I+O}{2}$$

should be computed. To accomplish this, both relays N and T must be dropped away as will be apparent. Initially, the description of the mode of operation of this portion of the circuit of FIGS. 9A–9C will be concerned with the computation of $$\frac{I+O}{2}$$

and it will be assumed, therefore, that relays N and T are both dropped away.

With relay T dropped away, its back contact 182 is closed thereby completing a feedback network around amplifier 180 through feedback resistor 183, and, with relay N also dropped away, a second feedback network is provided through feedback resistor 184 and through closed back contact 185 of relay N. Since both resistors 183 and 184 have a resistance value of one unit, amplifier 180 is provided with two continually closed parallel networks each having one unit of resistance; the equivalent of this, of course, is one feedback network having one-half unit of resistance.

Each of the several inbound and artery outbound presence detector relays controls the closure of a respective input network to the summing terminal ST of amplifier 180. As one example, relay 1A, when picked up, closes a circuit through its front contact 186 to complete a circuit to summing terminal ST from the $E_1$ voltage source, through resistors 187, 188 and 189, front contact 186, and back contact 182 of relay T. In a manner similar to that described previously in connection with FIGS. 6A, 6B, and 7, a two-position, multiple contact switch is associated with each of the detector relays to enable any particular input network to be opened as desired, thereby rendering a corresponding one of the detector relays ineffective in computing the output parameter provided by amplifier 180, and also to compensate for the ineffectiveness of such detector by changing the resistance values in each of the other networks associated with that relay. Incidentally, each of the various resistors appearing in any of the input or feedback networks associated with amplifier 180 is assumed to have a resistance value of one unit.

Since there are three artery inbound presence detector relays 1A, 2A and 3A, it is desired that there be three units of resistance in each of the three input networks respectively associated with these relays, assuming that all three corresponding inbound vehicle presence detectors are desired to be effective in the computation of the control parameter. Under these circumstances, each of the three switches 1AS, 2AS, and 3AS is placed in its upper, solid-line position with the result that none of the resistors in any of the input networks is shunted and there are then three units of resistance in each input network. Of course, if any artery inbound presence detector is desired to be ineffective, its associated switch is actuated to its lower, dotted-line position, whereby the particular input network otherwise selectively completed by the corresponding inbound presence detector relay is then open-circuited and, in addition, each of the remaining two input networks then has one of its resistors shunted to thereby reduce the and each of these has only two units of resistance.

Each of the artery outbound presence detector relays 1B and 2B similarly controls a respective input network extending from the terminal $E_1$ to the summing terminal ST of amplifier 180. Thus, relay 1B, when picked up, selectively completes an input network through front contact 190, and relay 2B selectively completes a similar input network through its front contact 191. Since there are but two artery outbound presence detector relays, there are only two input networks associated with these relays and each of these has only two units of resistance.

If, over any measuring interval T, all the inbound and outbound presence detector relays are continuously picked up, then the output voltage of amplifier 180 should substantially equal the $E_1$ reference voltage to represent an occupancy of 100%. Under these assumed conditions, three input networks to amplifier 180, respectively associated with the artery inbound presence detector relays 1A, 2A, and 3A, are continuously closed, and each includes three units of resistance. According to elementary principles of circuit analysis, the equivalent circuit for these three parallel input networks would comprise one input network having one unit of resistance. There would, in addition, be two input networks associated, respectively, with the artery outbound presence detector relays 1B and 2B which would continuously be completed. Since each of these has two units of resistance, the equivalent circuit for these two parallel networks would comprise one input network having one unit of resistance. Together, the two equivalent parallel input networks completed, respectively, through contacts 182 and 185 of relays T and N can be represented by a single equivalent circuit having one-half unit of resistance. Thus, under the presently assumed conditions in which all detector relays are continuously picked up, the total input and feedback resistances for amplifier 180 are equal, from which it follows that the output voltage $E_2$ should equal in amplitude the reference voltage $E_1$, i.e., the output voltage should represent 100 percent occupancy.

In accordance with the mathematical principles previously presented in connection with the description of FIG. 5A, it will be apparent that under more practical conditions where the various inbound and outbound presence detector relays are randomly operated for varying lengths of time as vehicles pass through the respective detection zones, the output voltage of amplifier 180 will tend to be closely proportional to the average of the inbound and outbound lane occupancies, i.e.

$$\frac{I+O}{2}$$

The output voltage of amplifier 180 is applied to an averaging circuit 192 which removes short-term variations from the computed parameter as a result of the long time-constant averaging that it provides. The output of averaging circuit 192 is applied to a level classifier 193 which selectively energizes relays R7 and R8 in accordance with the amplitude of the input to level classifier 193. If the level of this signal is quite high, both relays R7 and R8 are picked up, and a circuit is then completed from (+) through front contacts 194 and 195, to input terminal 196 of variable frequency pulse generator 197. Under the high lane occupancy conditions then existing, it is generally desirable to increase cycle length and, in a digital type system such as is disclosed in the aforementioned application S.N. 239,714, this desired increase of cycle length can be accomplished by reducing the pulse rate since a longer time must then elapse from one system zero time to the next.

For a somewhat lower amplitude of the output signal of amplifier 180, level classifier 193 will fail to pick up relay R7 while still being effective to pick up relay R8. Under those conditions, a circuit is completed through front contact 194 and back contact 195 to energize terminal 198 of pulse generator 197, thereby providing a somewhat higher pulse rate from the pulse generator 197 than occurred when wire 196 was energized, and this results in a somewhat shorter cycle length. Similarly, when the output of amplifier 180 decreases still further, level classifier 193 energizes neither relays R7 nor R8, and a circuit is then completed through back contact 194 of relay R8 to energize input terminal 199 of pulse generator 197, thereby causing pulse generator to operate with its fastest pulse rate thereby providing the shortest of the available cycle lengths of the system.

The output of averaging circuit 192 is also applied to a level classifier 200 which is of a two-level type and selectively energizes or deenergizes relay R9 in accordance with the output level of averaging circuit 192. When the output of amplifier 180, which is representative of artery occupancy generally, is at a quite low level, e.g., 5% occupancy or less, it is preferable that cycle length be dependent upon the average of inbound and outbound lane occupancy $$\frac{I+O}{2}$$

since the average can be expected to be more representative of artery congestion than either I or O alone. However, when the output of amplifier 180 reaches a substantially higher level, e.g., in excess of 5%, it is then generally desirable that cycle length be a function of lane occupancy of the more congested lane. If inbound traffic, for example, becomes quite high and substantially exceeds the amount of outbound traffic, it is desirable that cycle length be responsive only to the amount of inbound traffic, i.e., inbound lane occupancy I, rather than being responsive to the average of inbound and outbound lane occupancies. The reason for this, of course, is that inbound lane occupancy I, under the assumed conditions, may have a substantially greater value than the average of inbound and outbound lane occupancies, and it is preferable then to provide a cycle length which will adequately take care of the considerable inbound congestion; this can only be accomplished by providing a cycle length control parameter which truly reflects the magnitude of the traffic conditions then being encountered.

Assuming first, however, that the output of amplifier 180 is at a low level, e.g., representative of an occupancy value less than 5%, level classifier 200 will be ineffective to pick up relay R9. Front contact 201 of relay R9 is then open so that neither relay N nor relay T can be energized. Both back contacts 182 and 185 of these relays are then closed so that amplifier 180 will provide an output signal proportional to $$\frac{I+O}{2}$$

in accordance with the description already presented.

If, on the other hand, the output of amplifier 180 exceeds the predetermined limit, level classifier 200 energizes relay R9, thereby closing front contact 201 of this relay and energizing either relay N or relay T, dependent upon whether relay R11 is then picked up or dropped away. As will be described subsequently, relay R11 is selectively energized by level classifier 202 in accordance with the computed value $$\frac{I}{I+O}$$

and is energized only when this ratio is in excess of 50%, indicating thereby that I is greater than O. Assuming that relay R11 is picked up, this provides an indication that the presently higher amplitude output of amplifier 180 which has now resulted in the energization of relay R9 is the result of a high inbound lane occupancy I. Thus, since front contact 203 of relay R11 is now closed, relay N is energized and its back contact 185 is open. This has the effect of opening one of the two feedback networks for relay 180, i.e., the one which is otherwise completed through resistor 184. In addition, this opening of back contact 185 renders ineffective either of the input networks associated with the artery outbound relays 1B and 2B. Amplifier 180 is now left with one feedback network through back contact 182 of relay T and resistor 183 and with the three input networks associated, respectively, with relays 1A, 2A and 3A. Even though there are fewer input networks contributing electrical charge to summing terminal ST, the scale factor remains the same since there are now three parallel input networks, each having three units of resistance and one feedback network having one unit of resistance. Thus, here again, if all three relays 1A, 2A, and 3A were continuously closed, the amplifier output voltage would necessarily equal the reference voltage $E_1$ in absolute value, thereby indicating 100% lane occupancy. It is obvious that, under these circumstances, however, the output of amplifier 180 is representative only of inbound lane occupancy I and takes no account of outbound lane occupancy O.

In a similar manner, if relay R11 were deenergized, this would indicate that the high level of output of amplifier 180 were associated with a high outbound lane occupancy O since the deenergization of relay R11 would indicate a value of the computed ratio $$\frac{I}{I+O}$$

less than 50%. Relay T would then be energized through back contact 203 of relay R11, thereby opening back contact 182 of relay T so as to render ineffective any of the artery inbound presence detector relays 1A, 2A or 3A. The output of amplifier 180 would then be dependent upon the actuations of the artery outbound presence detector relays 1B and 2B and would be representative only of outbound lane occupancy O. Two parallel input networks, each with two units of resistance would be effective and one feedback network with one unit of resistance, providing thereby a balanced condition as before.

That portion of the apparatus of FIGS. 9A-9C which comprises operational amplifier 210, its shunt capacitor 211, and the various input and feedback networks for the amplifier compute the split control parameter. Under certain conditions, the output of amplifier 210 provides a voltage which varies in proportion to the value of the ratio $$\frac{c}{c+\frac{1}{2}(I+O)}$$

As explained in connection with FIG. 8, this ratio provides a relative measure of cross street occupancy to artery occupancy since C represents occupancy measured on the cross street and approaching the intersection, while I and O represent inbound and outbound lane occupancies.

In the computation of this parameter, both inbound and outbound lane occupancies I and O are taken into account when artery occupancy values are low, e.g., less than 5%. When, however, artery occupancy becomes higher, it is generally considered preferable to compute instead the ratio $$\frac{C}{C+I}$$

or $$\frac{C}{C+O}$$

dependent upon whether inbound or outbound lane occupancy I or O, respectively, is predominant. As in the computation of the cycle length parameter, inbound lane occupancy I or outbound lane occupancy O may be a great deal more significant than the average of inbound and output lane occupancies $$\frac{I+O}{2}$$

under conditions where there is a substantial difference between I and O. Accordingly, the cycle split computing apparatus is selectively controlled so that only cross street and artery bound occupancies are taken into account when I and O are above some predetermined lower limit and, concurrently, I exceeds O; whereas only outbound lane occupancy is taken into account together with cross street occupancy C when artery occupancy is above the predetermined lower limit but outbound occupancy O exceeds inbound occupancy I.

Since the factor of cross street occupancy C is desired to appear only in the numerator of the computed ratio, the input networks to amplifier 210 are associated only with the two cross street presence detector relays 1C and 2C. More specifically, the closure of front contact 212 of relay 1C selectively completes an input network to the summing terminal ST from the $E_1$ reference source through resistors 213 and 214, and front contact 215 selectively completes a similar input network whenever detector relay 2C is picked up. Each cross street presence detector relay has an associated switch 1CS or 2CS whose function will be understood from the description already presented in connection with FIGS. 6A and 6B.

Regardless of which of the several alternative parameters is being computed by amplifier 210, the factor of cross street occupancy C also appears in the denominator of each. Accordingly, relays 1C and 2C, through their respective front contacts 212 and 215, are capable of selectively closing feedback networks extending from the output of amplifier 210, over wire 216, and through either series resistors 217 and 218 or 219 and 220.

The arrangement of input and feedback networks controlled by the cross street presence detector relays is different in this embodiment than in FIG. 8 in that a single contact of each cross street presence detector relay 1C or 2C selectively closes both an input network and a feedback network, thereby resulting in a more economical use of relay contacts. The arrangement of FIG. 8 which uses separate contacts of the relay to control, respectively, the single input and single feedback network associated with each cross street presence detector relay is preferred since there is then less likelihood that there will be an interaction between the two; nevertheless, the arrangement of FIG. 8A may be used where it is considered desirable to use fewer relay contacts.

When artery occupancy is below the predetermined lower limit, it is desired that both inbound and outbound lane occupancies I and O be instrumental in determining the cycle split parameter. Under these conditions, as previously described in connection with the cycle length control apparatus involving amplifier 180, both relays N and T are dropped away since amplifier 180 then provides a relatively low level output with the result that relay R9 does not receive sufficient energization from level classifier 200 to pick up this relay. Front contact 201 of relay R9 is then opened so that neither relay N nor relay T can be energized.

With relay T dropped away, back contact 225 of this relay is closed so that a circuit is partially completed from the output terminal of amplifier 210 to wire 226. With respect to the particular feedback network which is directly associated with relay 1A, this means that, upon the picking up of relay 1A and the closure of its front contact 227, this particular feedback network can be completed through series-connected resistors 228, 229, 230, 231, 232, and 233 to the summing terminal ST. The two remaining feedback networks associated, respectively, with front contact 234 of relay 1B and front contact 235 of relay 1C may be completed in a similar manner provided that either of the respective detector relays 2A or 3A is picked up. It will be noted that in each of these three feedback networks, there are six series resistors, all assumed to have one unit of resistance. In contrast, in each of the input networks controlled respectively by relays 1C and 2C, there are but two units of resistance, one for each of the two cross street presence detector relays. The reason that each feedback network associated with the artery inbound presence detector relays have twice the resistance value per number of such relays is that the factor of inbound lane occupancy alone is to be taken at one-half the value of the cross street occupancy C in computing $$\frac{C}{c+\frac{1}{2}(I+O)}$$

The artery outbound presence detector relays 1B and 2B similarly control respective feedback networks. Under the assumed conditions, with relays N and T both dropped away, the amplifier output terminal is connected through back contact 237 of relay N to wire 238. Since front contact 239 of relay T is now dropped away, this permits a feedback network to be completed, whenever relay 1B is picked up and its front contact 240 is closed, through resistors 241, 242, 243, and 244 to the summing terminal ST. A similar feedback network is completed through front contact 245 of relay 2B whenever the latter relay is picked up.

In each of these feedback networks associated with the artery outbound detector relays 1B and 2B, there are four units of resistance, two for each of the two detector relays 1B and 2B, thereby also causing the outbound lane occupancy O to be, in effect, divided by two in its relative effectiveness in computing the cycle split parameter $$\frac{C}{C+\frac{1}{2}(I+O)}$$

Assume now that the output of amplifier 180 rises above some predetermined level which causes relay R9 to pick up and close its front contact 201. Assume further that the computed ratio $$\frac{I}{I+O}$$

is greater than 50% so that relay R11 is picked up, thereby closing its front contact 203 and energizing relay N. One result of this is the opening of back contact 237 of relay N so that none of the feedback networks associated with the artery outbound presence detector relays 1B and 2B can possibly be completed. This has the effect of eliminating the artery outbound occupancy O from the computed cycle split parameter. In other words, the output of amplifier 210 is now to be proportional to $$\frac{C}{C+I}$$

One additional compensation which must now be made in response to the energization of relay N is to increase, in fact double, the effectiveness of inbound lane occupancy in determining the value of $$\frac{C}{C+I}$$

since it is now to have equal weight with C. This is accomplished by the closure of each of front contacts 250, 251, and 252 of relay N. Considering, as a typical example, the first feedback network associated directly with artery inbound relay 1A, the closure of front contact 250 of relay N has the effect of shunting resistors 228, 229, and 230 in this feedback network, which means that, when this feedback network is completed upon the picking up of relay 1A, there will now be only three units of resistance in this network rather than six as before. This same modification occurs in each of the remaining two feedback networks associated respectively with relays 2A and 3A. The overall effect of this is to double the effectiveness of each of the artery inbound relays 1A, 2A, and 3A in computing the cycle split parameter $$\frac{C}{C+I}$$

From the description given thus far, it will be apparent that, if relay T were picked up instead of relay N, the opening of back contact 225 of relay T would render ineffective each of the three feedback networks associated with relays 1A, 2A and 3A and the closure of front contacts 239 and 253 of relay T would decrease by a factor of one-half the resistance in each of the networks associated with the artery outbound relays 1B and 2B thereby doubling the effectiveness of each of these relays. Then, by analogy with the preceding description, it can be seen that amplifier 210 would provide an output voltage representative $$\frac{C}{C+O}$$

In a manner identical to that previously described in connection with the embodiment of our invention shown in FIGS. 6A and 6B, a two-position, multiple contact ganged switch is associated with each presence detector relay and the purpose and effect of these switches is identical to that previously described.

For controlling offset, an offset computer may be provided similar to that shown in FIGS. 6A and 6B. Because of the detailed disclosure of the offset computer made there, it is deemed unnecessary to repeat it in FIG. 8B and also unnecessary to repeat the description thereof at this time. Thus, it should be apparent that the offset computer indicated by clock 254 in FIG. 9C may provide at its output a voltage which is proportional to the ratio $$\frac{I}{I+O}$$

When the values of I and O are both significant, the ratio will also be significant; however, if I and O are both very small, the ratio becomes insignificant and may vary over wide extremes in response to only slight variations in either value. Thus, one aspect of our invention is the provision of apparatus which will recognize when this condition occurs and thereby prevent, at such time, the computed ratio $$\frac{I}{I+O}$$

from exercising control over the selection of system offset.

This is accomplished by routing the output voltage of the offset computer 254 through a front contact 255 of relay R9 to averaging circuit 256. It will be remembered that level classifier 200 picks up relay R9 whenever the output of amplifier 180 rises above some predetermined low level. Thus, when relay R9 is picked up, it is known that artery occupancy is at some significant value so that the ratio $$\frac{I}{I+O}$$

must also be significant. It is then practical to apply the output of computer 254 to averaging circuit 256 and thereafter selectively energize relays R1 and R2 according to the value of the ratio. However, when relay R9 is dropped away, this is an indication that artery occupancy is at a low value and that the ratio $$\frac{I}{I+O}$$

may no longer be significant. In that case, back contact 255 of relay R9 closes, and averaging circuit 256 then has its input terminal connected through such back contact 255 to an adjustable tap on potentiometer 257. This is preferably adjusted to provide a level if input voltage for averaging circuit 256 that is representative of a 50% value for the ratio $$\frac{I}{I+O}$$

In other words, since inbound and outbound lane occupancies are at low values, it is known that a preferential offset is not desired and a 50% value of the computed ratio is then artificially provided to the system since this represents equality in inbound and outbound lane occupancies.

An additional advantage of providing an artificial input to averaging circuit 15 representative of a 50% value of the ratio $$\frac{I}{I+O}$$

is that this will provide an output from level classifier 202 which is substantially at the operating level of relay R11. That this comprises an operating advantage can be more readily understood by considering the situation which exists when relay R9 is deenergized because of a low level of output from amplifier 180. Relays N and T are then necessarily deenergized and averaging circuit 256 is supplied with the 50% input signal through back contact 255 of relay R9. Assuming now that the output of amplifier 180 rises above the predetermined level at which relay R9 picks up, it is desired that relay R11 be selectively energized at that very instant in accordance with whether I or O has the greater value in order that an immediate selection can be made as between relays N and T. This is considerably facilitated by having theretofore provided averaging circuit 256 with the 50% level input signal since this means that level classifier 202 has provided an energization level for relay R11 substantially at its predetermined operating point. Thus, as the output of amplifier 280 rises above the predetermined operating level of relay R9 and closes its front contact 256, the output signal provided by level classifier 202 immediately varies above or below the 50% level and positively actuates relay R11 to either its picked-up or dropped-away conditions. Thus, almost immediately after relay R9 picks up, the proper selection between relays N and T is made, thereby avoiding the existence of an interval wherein the condition of relay R11 is out of correspondence with what is currently being called for by the output of offset computer 254 so that the wrong one of the relays N and T is picked up.

As with the previous embodiments of the invention, level classifier 259 responds to the output of averaging circuit 256 and selectively energizes relays R1 and R2 which, through their respective contacts, select the appropriate offset for the system.

It will, of course, be appreciated that the offset computer 254 may be of the type which computes $$\frac{I-O}{I+O}$$

as shown in FIG. 7.

FIG. 9D illustrates a modification of the system of FIGS. 9A–9C. In FIG. 9D, level classifier 193 (see FIGS. 9A–9C) is shown as receiving an input from averaging circuit 192 which is representative of either I, O or $$\frac{I+O}{2}$$

Relays R7 and R9 are selectively energized by the output of level classifiers 193 in accordance with the level of input to this level classifier. The contacts 194 and 195 of relays R7 and R9 respectively, control pulse generator 197 to provide a pulse rate and corresponding cycle length dependent upon the operated conditions of these relays. This portion of the circuit is all similar to that shown in FIGS. 9A–9C.

The offset computer 254 supplies its output signal directly to averaging circuit 256 rather than through the contacts of any relays as in FIGS. 9A–9C. The output of averaging circuit 256 is then supplied to level classifier 259 which selectively energizes relays R1 and R2 in accordance with the computed level of $$\frac{I}{I+O}$$

As long as the output signal of level classifier 193 is at least of sufficient magnitude to energize relay R8, a circuit can be completed through front contact 260 of this relay to wire 271. If, in addition, inbound lane occupancy I is sufficiently high relative to outbound lane occupancy O to warrant an outbound preferential offset, both relays R1 and R2 are picked up and a circuit is completed from wire 271 and through front contacts 272 and 273 to the winding of relay N. On the other hand, if outbound lane occupancy O substantially exceeds inbound lane occupancy I, so that neither relay R1 nor R2 is picked up, a circuit is completed from wire 271, and through back contact 272 of the winding of relay T. For in between values of the ratio $$\frac{I}{I+O}$$

where relay R2 is picked but relay R1 is dropped away, no circuit can be completed from wire 271 to energize either relay N or relay T so both relays remain deenergized.

In the modification of FIG. 9D, one of the functions of relays N and T is to select which of the offsets shall be in effect. Thus, if relay N is picked up and relay T is dropped away, the (+) terminal of battery B1 is connected to line wire L1 through front contact 274 and back contact 275; similarly, the (−) terminal is connected to wire L2 through front contact 276 and back contact 277. This polarity of energization of wires L1 and L2 establishes an inbound preferential offset. It is apparent from FIG. 9D that the polarity of energization of wires L1 and L2 is reversed if relay T is picked up and relay N is dropped away, and this establishes an outbound preferential offset. If neither relay N nor relay T is picked up, wires L1 and L2 are deenergized and an "average" offset is put into effect.

If the output of level classifier 193 is at such a low level that not even relay R8 is energized, then front contact 278 of relay R8 is open and neither relay N nor relay T can be energized. As previously pointed out, with both relays N and T dropped away, an "average" offset is put into effect.

Relays N and T of this FIG. 9D have, in addition, the function provided by the corresponding relays N and T of FIGS. 9A–9C although not specifically illustrated in FIG. 9D, and thus are capable of selectively controlling input and feedback networks for both the cycle length and cycle split computing apparatus. The effect of this is that a predominance of traffic in either direction sufficient to establish a preferential offset causes the cycle length computing portion of the apparatus to be responsive only to the traffic in that predominant direction. In other words, if inbound lane occupancy I exceeds outbound lane occupancy O to a sufficient extent that relays R1 and N are energized to put into effect an inbound preferential offset, this picking up of relay N has the further effect of causing operational amplifier 180 to be responsive only to the inbound vehicle presence detectors as described in connection with FIGS. 9A–9C so that only inbound lane occupancy I is influential in determining the output of amplifier 180. The actuation of relay N has a similar effect on the operation of amplifier 210 which computes the cycle split parameter, as will be apparent from the preceding description relating to FIGS. 9A–9C.

Having described a system for the computation and utilization of various traffic control parameters, we wish it to be understood that various modifications and adaptations may be made without departing from the scope of our invention.

What we claim is:

1. In a traffic monitoring system, amplifier means having an input and an output, means responsive to traffic flow in a first predetermined direction for coupling a signal to said input having a magnitude related to the magnitude of traffic flow in said first direction, variable magnitude signal feedback means between said output and said input of said amplifier means, and means responsive to traffic flow in a second predetermined direction different from said first direction for varying the magnitude of signal feedback by said signal feedback means in relation to traffic flow in said second direction thereby to produce a resultant signal at said amplifier output jointly related to the traffic flows in both said first and second directions.

2. In a traffic system, a first plurality of vehicle presence detectors spaced from one another along a thoroughfare in a first direction of traffic flow, a second plurality of vehicle presence detectors spaced from one another along a thoroughfare in a second direction of traffic flow different from said first direction, an operational amplifier having an input and an output, signal input means responsive to operation of said first plurality of detectors for applying a signal to said amplifier input having a magnitude related to traffic flow along said first direction, signal feedback means between the output and input of said amplifier, means responsive to operation of said second plurality of detectors for producing a feedback signal between said amplifier output and said amplifier input having a magnitude related to traffic flow along said second direction, whereby a resultant signal is produced at said amplifier output having a magnitude which is at least partially directly related to traffic flow in one of said directions and at least partially inversely related to traffic flow in the other of said directions.

3. In a traffic control system, an operational amplifier having an input terminal, an output terminal, and variable impedance feedback means between said output and input terminals, means responsive to traffic flow in a predetermined first direction operative at least to apply a signal to said amplifier input terminal in relation to said first directional traffic flow, means responsive to traffic flow in a predetermined second direction operative at least to vary the impedance of said feedback means in relation to said second directional traffic flow, and means responsive to the resultant signal at said amplifier output for controlling traffic flow in at least one of said first and second directions.

4. In a traffic control system, operational amplifier means having an output and an input, means responsive to traffic flow in a first predetermined direction for applying an input signal to said amplifier input having a magnitude related to the magnitude of traffic flow in said first direction, means responsive to traffic flow in a second predetermined direction different from said first direction for producing a feedback signal from said amplifier output to said amplifier input having a magnitude related to the magnitude of traffic flow in said second direction, thereby to produce a resultant signal at said amplifier output having a magnitude related to the comparative traffic flow in said first and second directions, and means responsive to said resultant signal for controlling the traffic flow in at least one of said first and second directions.

5. In a traffic system, an integrating operational amplifier having an input terminal, an output terminal, and feedback means between said output and input terminals, means responsive to the percentage of a thoroughfare which is occupied by vehicles in at least a predetermined first direction of traffic flow for applying a related input signal to said amplifier input, means responsive to the percentage of a thoroughfare which is occupied by vehicles in at least a predetermined second and different direction of traffic flow for producing a related feedback signal in said feedback means, and means responsive to the resultant signal at said amplifier output for controlling traffic flow in at least one of said first and second directions.

6. In a traffic control system, first vehicle presence detector means positioned to monitor traffic flow in a first direction, second vehicle presence detector means positioned to monitor traffic flow in a second direction different from said first direction, first means responsive to operation of said first detector means for producing a first signal having a magnitude related to traffic flow in said first direction, second means including at least an amplifier having a feedback network responsive to operation of said second detector means for modifying said first signal in relation to traffic flow in said second direction thereby to produce a resultant signal at the output of said amplifier having a magnitude which is at least partially directly related to traffic flow in one of said directions and at least partially inversely related to traffic flow in the other of said directions, and means responsive to said resultant signal for controlling the flow of traffic in at least one of said directions.

7. In a traffic system, a first plurality of vehicle detectors spaced from one another along a first path of traffic flow, a second plurality of vehicle detectors spaced from one another along a second path of traffic flow, signal accumulating means, first means responsive to operation of said first plurality of detectors for adding an incremental signal to said accumulating means having a magnitude related at least to the percentage of said first plurality of detectors which are detecting vehicles at any given time, second means responsive to operation of said second plurality of detectors for subtracting an incremental signal from said accumulating means having a magnitude relate at least to the percentage of said second plurality of detectors which are detecting vehicles at any given time, whereby a resultant signal is produced in said accumulating means by the operation of said first and second means which is representative of the difference in traffic flow along the respective first and second paths.

8. The system of claim 7 which further includes means responsive to the resultant signal in said accumulating means for controlling traffic flow along at least one of said paths.

9. In a traffic system, a first plurality of vehicle detectors spaced from one another along a first direction of traffic flow, a second plurality of vehicle detectors spaced from one another along a second direction of traffic flow, signal accumulating means, first means operative independently of the magnitude of signal in said accumulating means for adding an incremental first signal to said accumulating means having a magnitude related to the percentage of said first plurality of detectors which are detecting vehicles at any given time, second means for subtracting an incremental second signal from said accumulating means having a magnitude jointly related to the magnitude of signal in said accumulating means and to the percentage of said second plurality of detectors which are detecting vehicles at any given time, whereby a resultant signal is produced in said accumulating means by the operation of said first and second means which is representative of the difference in traffic flows along said first and second paths.

10. The system of claim 9 which further includes traffic control means, and means responsive to the resultant signal in said accumulating means for controlling the operation of said traffic control means.

11. The system of claim 9 in which each vehicle detector is a presence detector defining a predetermined detection zone and detects each vehicle throughout the time required for said vehicle to pass through said detection zone.

12. In a traffic system, a first plurality of vehicle detectors spaced from one another along a first path of traffic flow, a second plurality of vehicle detectors spaced from one another along a second path of traffic flow, signal accumulating means, first means responsive to operation of said first plurality of detectors for producing a first signal having a magnitude related at least to the percentage of said first plurality of detectors which are detecting vehicles at any given time, second means responsive to operation of said second plurality of detectors for producing a second signal having a magnitude related at least to the percentage of said second plurality of detectors which are detecting vehicles at any given time, means jointly responsive to said first and second signals for producing a resultant signal in said accumulating means, and means responsive to said resultant signal in said accumulating means for controlling traffic flow along at least one of said paths.

13. In a traffic responsive system, at least one first vehicle presence detector defining a detection zone along a first traffic flow path and at least one second vehicle detector defining a detection zone along a second traffic flow path, each said presence detector defining a detection zone and demarcating the occupancy time of each vehicle in the respective zone, signal accumulating means, first means for increasing the signal accumulated in said signal accumulating means in response to the detection of a vehicle by any one first vehicle detector at a substantially uniform rate throughout each vehicle presence period demarcated by said one first detector, second means for decreasing the signal accumulated in said accumulating means in response to the detection of a vehicle by any one second vehicle detector at a rate substantially proportional to the instantaneous magnitude of the accumulated signal throughout each vehicle presence period demarcated by said one second presence detector, whereby the resultant accumulated signal has its magnitude proportional to the difference in traffic flows along said first and second paths.

14. The system as defined in claim 13 whereby said first means increases the accumulated signal at each instant at a rate proportional to the number of said first vehicle detectors which are at that instant detecting the presence of a vehicle, and said second means decreases the accumulated signal at each instant at a rate which is at least proportional to the number of said second vehicle detectors which are at that instant detecting the presence of a vehicle.

15. Apparatus for producing a representation of the average of the traffic flows along at least two different traffic flow paths comprising, at least one first vehicle detector for detecting vehicles passing along said first path, at least one second vehicle detector for detecting vehicles passing along said second path, signal accumulating means, first means responsive to the detection of a vehicle by any of said first detectors for increasing the signal accumulated in said signal accumulating means, second means responsive to the detection of a vehicle by any of said second means for also increasing the signal accumulated in said signal accumulating means, and means for decreasing the accumulated signal substantially continuously at a rate proportional to the magnitude of the accumulated signal.

16. The apparatus as defined in claim 15 wherein each said detector is a vehicle presence detector defining a detection zone and demarcating the occupancy time of said detection zone by each vehicle passing therethrough, and each said first and second means respectively increases the accumulated signal at each instant at a rate substantially proportional to the number of first and second vehicle detectors respectively which are at that instant detecting the presence of vehicles.

17. The apparatus as defined in claim 16 wherein said signal accumulating means includes an integrating operational amplifier having an input terminal and an output terminal, said first means comprising an input network for each said first detector which is completed between said input terminal and a source of reference potential when the respective first detector is detecting a vehicle, and said second means comprises an input network for each said second detector which is completed between said input terminal and said source of reference potential when the respective second detector is detecting a vehicle.

18. The apparatus as defined in claim 17 wherein each said input network of said first means includes an amount of electric resistance proportional to the number of operative first vehicle detectors, and said second means includes an amount of electric resistance proportional to the number of operative second vehicle detectors.

19. Traffic responsive apparatus comprising, a plurality of vehicle detectors for detecting vehicles passing along a traffic flow path, signal accumulating means having an input and an output, a network for each vehicle detector for coupling a signal to said accumulator input only at selected intervals related to vehicle detection intervals demarcated by the respective vehicle detector, resistance means in each said network for controlling the magnitude of signal coupled to said accumulator input, and switching means for each detector for at times rendering ineffective the particular network associated with said detector and for simultaneously altering the resistance value in each of the remaining networks respectively associated with the other detectors.

20. Traffic responsive apparatus comprising, a first plurality of vehicle detectors for detecting vehicles passing along a first traffic flow path, a second plurality of vehicle detectors for detecting vehicles passing along a second traffic flow path, signal accumulating means having an input and an output, a network for each vehicle detector for coupling a signal to said accumulator input in response to the detection of a vehicle by said vehicle detector, resistance means in each said network for controlling the magnitude of signal coupled to said accumulator input via said network, at least some of said vehicle detectors having associated switching means selectively operable to a distinctive condition in which the respective network is continuously opened irrespective of the condition of the respective vehicle detector, each said switching means when in said distinctive condition simultaneously acting on each of the other networks associated with the remaining detectors included in the respective first or second plurality of detectors to increase the magnitude of the signal coupled to said accumulator input through such other networks.

21. The invention as claimed in claim 20 wherein said switching means in acting on each of said other networks reduces the resistance in each by an amount which is inversely proportional to the number of vehicle detectors included in the corresponding first or second plurality of vehicle detectors.

22. The invention as claimed in claim 20 which further includes means responsive to the failure of a detector to respond to vehicles passing along the respective traffic flow path, and means responsive to said last-named means for operating the switching means associated with the failed detector to its said distinctive condition.

23. The invention defined in claim 22 wherein said detector failure responsive means comprises means responsive to the absence of a vehicle detection by said detector for a predetermined time to thereby indicate the failure of said detector.

24. The invention as defined in claim 23 wherein said detector failure responsive means includes further clock-controlled means demarcating different predetermined times at different times of the day.

25. In a system for controlling offset in a progressive traffic signal system, a first plurality of vehicle detectors spaced from one another along at least one inbound lane of an artery, a second plurality of vehicle detectors spaced from one another along at least one outbound lane of said artery, signal accumulating means, first means operative independently of the magnitude of signal in said accumulating means for adding an incremental first signal to said accumulating means having a magnitude related to the percentage of said first plurality of detectors which are detecting vehicles at any given time, second means for subtracting an incremental second signal from said accumulating means having a magnitude jointly related to the magnitude of the signal in said accumulating means and to the percentage of said first plurality of detectors which are detecting vehicles at any given time, third means for subtracting an incremental third signal from said accumulating means having a magnitude jointly related to the magnitude of signal in said accumulating means and to the percentage of said second plurality of detectors which are detecting vehicles at any given time, whereby a resultant signal is produced in said accumulating means which is proportional to the ratio of inbound traffic flow to the sum of the inbound and outbound traffic flows along said artery, and means responsive to said resultant signal for controlling the offset of said traffic system.

26. The traffic system of claim 25 in which each said vehicle detector is a presence-type detector defining a respective detection zone and demarcating a time interval which substantially equals the occupancy time of said vehicle in said detection zone.

27. In a system for the control of offset in a traffic signalling system, a first plurality of vehicle detectors spaced from one another along at least one inbound lane of an artery, a second plurality of vehicle detectors spaced from one another along at least one outbound lane of an artery, signal accumulating means, first means operative independently of the magnitude of signal in said accumulating means for adding an incremental first signal to said accumulating means having a magnitude related to the percentage of said first plurality of detectors which are detecting vehicles at any given time, second means operative independently of the magnitude of signal in said accumulating means for subtracting an incremental second signal from said accumulating means having a magnitude related to the percentage of said second plurality of detectors which are detecting vehicles at any given time, third means for subtracting an incremental third signal from said accumulating means having a magnitude jointly related to the magnitude of signal in said accumulating means and to the percentage of said first plurality of detectors which are detecting vehicles at any given time, fourth means for subtracting an incremental fourth signal from said accumulating means having a magnitude jointly related to the magnitude of signal in said accumulating means and to the percentage of said second plurality of detectors which are detecting vehicles at any given time, wherein a resultant signal is produced in said accumulating means by the operation of said first and second plurality of vehicle detectors which is representative of the ratio of the difference in inbound and outbound traffic flows and the sum of inbound and outbound traffic flows, and means responsive to the accumulated signal for controlling the offset of said system.

28. The traffic system as defined in claim 27 in which each of said vehicle detectors is a presence-type detector defining a respective detection zone and continuously providing a vehicle detection output substantially throughout the time that the respective detection zone is occupied by a vehicle.

29. In a system for the control of cycle split in a traffic signalling system, at least one vehicle detector positioned ot respond to vehicles travelling along an artery, at least one vehicle detector positioned to respond to vehicles passing along a cross street and approaching an intersection with said artery, signal accumulating means, first means operative independently of the magnitude of signal in said accumulating means for adding an incremental signal to said accumulating means in response to each detection of a vehicle by said first vehicle detector, second means for subtracting an incremental signal from said accumulating means in response to each detection of a vehicle by said second vehicle detector, a traffic signal alternately according right-of-way to artery and cross street vehicles at said intersection, and means responsive to the magnitude of the accumulated signal for controlling the proportionate times of the artery and cross street accord signals.

30. In a traffic system for controlling the relative accord signal indications presented alternately by at least one traffic signal to artery and cross street traffic at an intersection, at least one vehicle presence detector for detecting vehicles approaching said intersection while travelling along said artery, at least one vehicle presence detector for detecting vehicles approaching said intersection while travelling along said cross street, signal accumulator means, first means operative independently of the magnitude of the signal in said accumulating means for adding an incremental signal to said accumulating means in response to each detection of a vehicle by a selected one of said first and second vehicle detectors, second means for subtracting an incremental signal from said accumulating means in response to each detection of a vehicle by the other of said first and second vehicle detectors, and means responsive to the accumulated signal for controlling the relative durations of the artery and cross street accord signals displayed by said traffic signal.

31. Means for controlling cycle length in a progressive type signalling system comprising in combination at least one vehicle detector responsive to artery inbound traffic, at least one vehicle detector responsive to artery outbound traffic, first means responsive to said vehicle detectors for producing selectviely and alternatively a signal whose magnitude is representative of inbound traffic flow, outbound traffic flow, and the average of inbound and outbound traffic flows; second means responsive to said inbound and outbound vehicle detectors for producing a second signal representative of the difference in inbound and outbound traffic flows, third means responsive to the magnitude of said second signal for controlling said first means to provide a predetermined one of i's alternative output signals, and fourth means responsive to the magnitude of said first signal for controlling the cycle length of said signalling system.

32. The invention as set forth in claim 31 wherein means controlled by the magnitude of said second signal controls the offset for said traffic signal system; said third means controls said first means to provide its said output signal which is representative of the average of inbound and outbound traffic flows only when non-preferrential offset is in effect, to provide an output signal which is representative of inbound traffic flow only when an inbound preferential offset is in effect, and to provide a signal which is representative of outbound traffic flow only when an outbound preferential offset is in effect.

33. In a traffic responsive system, at least one first vehicle presence detector for detecting vehicles travelling along a first path, at least one second vehicle presence detector for detecting vehicles travelling along a second path, signal accumulating means, first means responsive substantially throughout the time of detection of a vehicle by said first detector for increasing the signal accumulated in said signal accumulating means at a predetermined uniform rate throughout the detection time of such vehicle, second means responsive substantially throughout the time of detection of a vehicle by said second detector for decreasing the signal accumulated in said signal accumulating means at a rate proportional to the magnitude of said accumulated signal, whereby the resultant signal in said signal accumulating means is representative of the difference in traffic flow along said first and second paths.

References Cited

UNITED STATES PATENTS

| 3,097,295 | 7/1963 | Williams | 235—92 |
| 3,109,157 | 6/1963 | Bolton | 235—92 |
| 3,120,651 | 2/1964 | Hendricks | 235—150.24 |
| 3,233,084 | 2/1966 | Kendall et al. | 235—150.24 |

MALCOLM A. MORRISON, *Primary Examiner.*

MARTIN P. HARTMAN, *Examiner.*

A. SARLI, *Assistant Examiner.*